(12) United States Patent
Goran et al.

(10) Patent No.: US 11,910,169 B2
(45) Date of Patent: *Feb. 20, 2024

(54) METHODS, SYSTEMS, AND MEDIA FOR AMBIENT BACKGROUND NOISE MODIFICATION BASED ON MOOD AND/OR BEHAVIOR INFORMATION

(71) Applicant: Google LLC, Mountain View, CA (US)

(72) Inventors: Charles Goran, Morgan Hill, CA (US); Eric H C Liu, Redwood City, CA (US); Kevin Brune, Davis, CA (US); Duane Richard Valz, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,918

(22) Filed: Nov. 28, 2022

(65) Prior Publication Data

US 2023/0092307 A1 Mar. 23, 2023

Related U.S. Application Data

(63) Continuation of application No. 17/086,821, filed on Nov. 2, 2020, now Pat. No. 11,516,580, which is a
(Continued)

(51) Int. Cl.
*H04R 3/00* (2006.01)
*G05B 15/02* (2006.01)
*H04L 12/28* (2006.01)

(52) U.S. Cl.
CPC ............. *H04R 3/002* (2013.01); *G05B 15/02* (2013.01); *H04L 12/2827* (2013.01); *G05B 2219/2642* (2013.01)

(58) Field of Classification Search
CPC .......... H04R 3/002; G05B 15/02; G05B 6/02; G05B 2219/2642; H04L 12/2827;
(Continued)

(56) References Cited

U.S. PATENT DOCUMENTS 6,591,198 B1 7/2003 Pratt
6,647,410 B1 11/2003 Scimone et al.
(Continued)

FOREIGN PATENT DOCUMENTS

CN 101981570 2/2011
CN 102622404 8/2012
(Continued)

OTHER PUBLICATIONS

Examination Report dated Feb. 23, 2023 in EP Patent Application No. 15828465.3.
(Continued)

*Primary Examiner* — Yogeshkumar Patel
(74) *Attorney, Agent, or Firm* — Brake Hughes Bellermann LLP

(57) ABSTRACT

Methods, systems, and media for ambient background noise modification are provided. In some implementations, the method comprises: identifying at least one noise present in an environment of a user having a user device, an activity the user is currently engaged in, and a physical or emotional state of the user; determining a target ambient noise to be produced in the environment based at least in part on the identified noise, the activity the user is currently engaged in, and the physical or emotional state of the user; identifying at least one device associated with the user device to be used to produce the target ambient noise; determining sound outputs corresponding to each of the one or more identified devices, wherein a combination of the sound outputs produces an approximation of one or more characteristics of the
(Continued)

target ambient noise; and causing the one or more identified devices to produce the determined sound outputs.

18 Claims, 14 Drawing Sheets

Related U.S. Application Data continuation of application No. 16/575,742, filed on Sep. 19, 2019, now Pat. No. 10,880,641, which is a continuation of application No. 15/703,389, filed on Sep. 13, 2017, now Pat. No. 10,425,725, which is a continuation of application No. 14/619,827, filed on Feb. 11, 2015, now Pat. No. 9,769,564.

(58) Field of Classification Search
CPC .......... G10L 21/0208; H04N 21/44218; H04N 21/4126; H04N 21/42203; A61B 5/165; A61B 5/163; A61B 5/7405
See application file for complete search history.

(56) References Cited

U.S. PATENT DOCUMENTS

| | | | |
|---|---|---|---|
| 6,680,675 | B1 | 1/2004 | Suzuki |
| 8,154,418 | B2 | 4/2012 | Peterson et al. |
| 8,533,266 | B2 | 9/2013 | Koulomzin et al. |
| 8,619,157 | B2 | 12/2013 | Holmes |
| 8,798,596 | B2 | 8/2014 | Shuster et al. |
| 8,799,277 | B2 | 8/2014 | Park et al. |
| 8,812,258 | B2 | 8/2014 | Nadkarni et al. |
| 8,824,751 | B2 | 9/2014 | Wise |
| 8,897,505 | B2 | 11/2014 | Gokturk et al. |
| 9,046,919 | B2 | 6/2015 | Niknejad |
| 9,055,276 | B2 | 6/2015 | Parulski |
| 9,086,798 | B2 | 7/2015 | Barrus et al. |
| 9,275,079 | B2 | 3/2016 | Nalawadi et al. |
| 9,300,706 | B1 | 3/2016 | Wise |
| 9,535,499 | B2 | 1/2017 | Lee et al. |
| 9,910,865 | B2 | 3/2018 | Mikolajczyk et al. |
| 9,953,514 | B2 | 4/2018 | Fadell et al. |
| 9,984,349 | B2 | 5/2018 | Skaaksrud |
| 10,068,060 | B2 | 9/2018 | Madan et al. |
| 11,516,580 | B2 * | 11/2022 | Goran .................... G05B 15/02 |
| 2001/0019657 | A1 | 9/2001 | McGrath et al. |
| 2005/0246637 | A1 | 11/2005 | Knight et al. |
| 2007/0100666 | A1 | 5/2007 | Stivoric et al. |
| 2007/0168514 | A1 | 7/2007 | Cocotis et al. |
| 2007/0247431 | A1 | 10/2007 | Skillman et al. |
| 2008/0038702 | A1 | 2/2008 | Choquet |
| 2008/0091515 | A1 | 4/2008 | Theieberger et al. |
| 2008/0097979 | A1 | 4/2008 | Heidloff et al. |
| 2008/0183824 | A1 | 7/2008 | Chen et al. |
| 2009/0002178 | A1* | 1/2009 | Guday ................. A61B 5/0002 340/573.1 |
| 2009/0002939 | A1 | 1/2009 | Baugh et al. |
| 2009/0058819 | A1 | 3/2009 | Gioscia et al. |
| 2009/0089241 | A1 | 4/2009 | Zelinsky et al. |
| 2009/0092262 | A1 | 4/2009 | Costa et al. |
| 2009/0265165 | A1 | 10/2009 | Apelqvist et al. |
| 2009/0265330 | A1 | 10/2009 | Cheng et al. |
| 2009/0287995 | A1 | 11/2009 | Tsao |
| 2009/0292526 | A1 | 11/2009 | Harari et al. |
| 2009/0319938 | A1 | 12/2009 | Vaughan et al. |
| 2010/0153175 | A1 | 6/2010 | Pearson et al. |
| 2010/0241663 | A1 | 9/2010 | Huang et al. |
| 2011/0021898 | A1 | 1/2011 | Wei et al. |
| 2011/0125063 | A1 | 5/2011 | Shalon et al. |
| 2011/0126123 | A1 | 5/2011 | Reter et al. |
| 2011/0231770 | A1 | 9/2011 | Tovar |
| 2011/0276396 | A1 | 11/2011 | Rathod |
| 2011/0279359 | A1* | 11/2011 | McCarty .......... H04N 21/42203 345/156 |
| 2011/0299235 | A1 | 12/2011 | Liu et al. |
| 2012/0239761 | A1 | 9/2012 | Linner et al. |
| 2012/0258437 | A1 | 10/2012 | Sadeh-Koniecpol et al. |
| 2012/0314917 | A1 | 12/2012 | Kiyohara et al. |
| 2012/0316455 | A1 | 12/2012 | Rahman et al. |
| 2013/0027571 | A1 | 1/2013 | Parulski |
| 2013/0036117 | A1 | 2/2013 | Fisher et al. |
| 2013/0052946 | A1 | 2/2013 | Chatterjee et al. |
| 2013/0089243 | A1 | 4/2013 | Sauve et al. |
| 2013/0111514 | A1 | 5/2013 | Slavin et al. |
| 2013/0111531 | A1 | 5/2013 | Kawai et al. |
| 2013/0147597 | A1 | 6/2013 | Omar et al. |
| 2013/0166076 | A1 | 6/2013 | Karr |
| 2013/0169680 | A1 | 7/2013 | Chien et al. |
| 2013/0198260 | A1 | 8/2013 | Dow et al. |
| 2013/0212176 | A1 | 8/2013 | Koulomzin et al. |
| 2013/0325858 | A1 | 12/2013 | Xu |
| 2014/0025620 | A1 | 1/2014 | Froimowitz et al. |
| 2014/0040010 | A1 | 2/2014 | Garcia-Martinez |
| 2014/0052282 | A1 | 2/2014 | Balassanian |
| 2014/0067130 | A1 | 3/2014 | Pillai et al. |
| 2014/0089243 | A1 | 3/2014 | Oppenheimer |
| 2014/0089401 | A1 | 3/2014 | Filev et al. |
| 2014/0126706 | A1 | 5/2014 | Barbulescu et al. |
| 2014/0146970 | A1 | 5/2014 | Kim et al. |
| 2014/0156566 | A1 | 6/2014 | Kabiljo et al. |
| 2014/0180744 | A1 | 6/2014 | Kozloski et al. |
| 2014/0207460 | A1 | 7/2014 | Jiang et al. |
| 2014/0207811 | A1 | 7/2014 | Kim et al. |
| 2014/0223462 | A1 | 8/2014 | Aimone et al. |
| 2014/0244617 | A1 | 8/2014 | Rose |
| 2014/0280529 | A1 | 9/2014 | Davis et al. |
| 2014/0298364 | A1 | 10/2014 | Stepanov et al. |
| 2014/0334653 | A1 | 11/2014 | Luna et al. |
| 2014/0350349 | A1 | 11/2014 | Geurts et al. |
| 2014/0353049 | A1 | 12/2014 | Vidal et al. |
| 2014/0371909 | A1 | 12/2014 | Lee et al. |
| 2015/0006296 | A1 | 1/2015 | Gupta et al. |
| 2015/0019714 | A1 | 1/2015 | Shaashua et al. |
| 2015/0105608 | A1 | 4/2015 | Lipoma et al. |
| 2015/0109104 | A1 | 4/2015 | Fadell et al. |
| 2015/0109112 | A1 | 4/2015 | Fadell et al. |
| 2015/0112885 | A1 | 4/2015 | Fadell et al. |
| 2015/0116107 | A1 | 4/2015 | Fadell et al. |
| 2015/0116108 | A1 | 4/2015 | Fadell et al. |
| 2015/0116109 | A1 | 4/2015 | Fadell et al. |
| 2015/0136862 | A1 | 5/2015 | Wolf |
| 2015/0149390 | A1 | 5/2015 | Brdiczka et al. |
| 2015/0278330 | A1 | 10/2015 | Hawa et al. |
| 2015/0296594 | A1 | 10/2015 | Blum et al. |
| 2015/0324698 | A1 | 11/2015 | Karaoguz et al. |
| 2015/0356121 | A1 | 12/2015 | Schmelzer |
| 2015/0370993 | A1 | 12/2015 | Moturu et al. |
| 2016/0063532 | A1 | 3/2016 | Loeb et al. |
| 2016/0063874 | A1 | 3/2016 | Czerwinski et al. |
| 2016/0083073 | A1 | 3/2016 | Beckman |
| 2016/0085802 | A1 | 3/2016 | Rios, III et al. |
| 2016/0110524 | A1 | 4/2016 | Short et al. |
| 2016/0123743 | A1 | 5/2016 | Sisbot et al. |
| 2016/0179833 | A1 | 6/2016 | Lin et al. |
| 2016/0179943 | A1 | 6/2016 | Ku et al. |
| 2016/0179962 | A1 | 6/2016 | Patten et al. |
| 2017/0154176 | A1 | 6/2017 | Yun et al. |
| 2017/0172494 | A1 | 6/2017 | Warren et al. |
| 2017/0238859 | A1 | 8/2017 | Sadowsky et al. |
| 2017/0372271 | A1 | 12/2017 | Goldsmith et al. |
| 2020/0336778 | A1 | 10/2020 | Saretto et al. |
| 2020/0349610 | A1 | 11/2020 | Publicover et al. |

FOREIGN PATENT DOCUMENTS

| | | |
|---|---|---|
| CN | 103052954 | 4/2013 |
| CN | 103574837 | 2/2014 |
| CN | 103595858 | 2/2014 |
| CN | 203465576 | 3/2014 |
| CN | 103941853 | 7/2014 |
| CN | 103984692 | 8/2014 |
| CN | 104182449 | 12/2014 |
| CN | 102907019 | 7/2015 |
| GB | 2503546 | 1/2014 |

(56) References Cited

FOREIGN PATENT DOCUMENTS

| JP | 2006254285 | 9/2006 |
|---|---|---|
| JP | 2006282111 | 10/2006 |
| JP | 2013110736 | 6/2013 |
| JP | 2018512607 | 5/2018 |
| KR | 20140011204 | 1/2014 |
| WO | WO 2001050387 | 7/2001 |
| WO | WO 2011001002 | 1/2011 |
| WO | WO 2013088307 | 6/2013 |
| WO | WO 2014005868 | 1/2014 |
| WO | WO 2014022157 | 2/2014 |
| WO | WO 2014071165 | 5/2014 |
| WO | WO 2014159297 | 10/2014 |

OTHER PUBLICATIONS

Notice of Allowance dated Jan. 19, 2023 in U.S. Appl. No. 17/026,950.
Anguera, X. and Oliver, N., "Mami: Multimodal Annotations on a Camera Phone", In Proceedings of The 10th International Conference on Human Computer Interaction with Mobile Devices and Services, New York, NY, US, Sep. 5, 2008, pp. 1-4.
CSP Search Report at KIPO dated Oct. 22, 2018 in U.S. Appl. No. 15/703,389.
Dean, J. and Ghemawat, S., "MapReduce: Simplified Data Processing on Large Clusters", in Communications of the ACM, vol. 51, No. 1, Jan. 2008, pp. 107-113.
Decision of Rejection dated Sep. 3, 2019 in JP Patent Application No. 2017542160.
Decision to Refuse a European Patent Application dated Nov. 16, 2021 in EP Patent Application No. 15826281.6.
Examination Report dated Feb. 22, 2021 in EP Patent Application No. 15828463.8.
Examination Report dated Mar. 1, 2019 in EP Patent Application No. 15826281.6.
Examination Report dated Mar. 3, 2021 in GB Patent Application No. 1714394.2.
Examination Report dated Jun. 24, 2019 in EP Patent Application No. 15828465.3.
Examination Report dated Jun. 29, 2020 in EP Patent Application No. 15828465.3.
Examination Report dated Jul. 12, 2021 in EP Patent Application No. 1714395.9.
Examination Report dated Aug. 31, 2021 in GB Patent Application No. 1714395.9.
Examination Report dated Sep. 20, 2021 in EP Patent Application No. 1714395.9.
Examination Report dated Oct. 7, 2020 in GB Patent Application No. 1714395.9.
Examination Report dated Oct. 16, 2020 in IN Patent Application No. 201747026742.
Examination Report dated Oct. 30, 2020 in GB Patent Application No. 1714393.4.
Examination Report dated Dec. 2, 2021 in EP Patent Application No. 15828465.3.
Hazen, T.J. et al., "Speech-Based Annotation and Retrieval of Digital Photographs", In Proceedings of Interspeech 8th Annual Conference of the International Speech Communication Association, Antwerp, BE, Aug. 27-31, 2007, pp. 2165-2168.
Tzanetakis, G., "ICME 2004 Tutorial: Audio Feature Extraction", Jul. 11, 2004, available at: http://eletric.ufpr.br/ufpr2/professor/36/TE808/featureextraction/AudioFeatureExtraction3.pdf, pp. 1-95.
International Search Report & Written Opinion dated Mar. 4, 2016 in International Patent Application No. PCT/US2015/068158.
International Search Report & Written Opinion dated Mar. 23, 2016 in International Patent Application No. PCT/US2015/068145.
International Search Report & Written Opinion dated Mar. 24, 2016 in International Patent Application No. PCT/US2015/068176.
International Search Report & Written Opinion dated Apr. 11, 2016 in International Patent Application No. PCT/US2015/068164.
International Search Report & Written Opinion dated Apr. 11, 2016 in International Patent Application No. PCT/US2015/068168.
International Search Report & Written Opinion dated Apr. 21, 2016 in International Patent Application No. PCT/US2015/068171.
Likamwa, R. et al. "Can Your Smartphone Infer Your Mood?", In Proceedings of ACM Workshop on Sensing Applications on Mobile Phones (Photosense), Nov. 2011, pp. 1-5.
Melnick, S. et al, "Dremel: Interactive Analysis of Web-Scale Datasets", in Proceedings of the VLDB Endowment, vol. 3, No. 1-2, Sep. 2010, pp. 330-339.
Notice of Allowance dated Feb. 24, 2021 in U.S. Appl. No. 14/619,843.
Notice of Allowance dated Mar. 17, 2022 in U.S. Appl. No. 14/619,821.
Notice of Allowance dated May 13, 2019 in U.S. Appl. No. 15/703,389.
Notice of Allowance dated May 18, 2017 in U.S. Appl. No. 14/619,827.
Notice of Allowance dated May 19, 2020 in U.S. Appl. No. 16/403,932.
Notice of Allowance dated Jun. 26, 2020 in U.S. Appl. No. 16/575,742.
Notice of Allowance dated Jul. 7, 2022 in U.S. Appl. No. 17/360,279.
Notice of Allowance dated Jul. 13, 2022 in U.S. Appl. No. 17/086,821.
Notice of Allowance dated Oct. 11, 2018 in U.S. Appl. No. 14/619,863.
Notice of Allowance dated Dec. 28, 2018 in U.S. Appl. No. 14/619,894.
Office Action dated Jan. 8, 2019 in U.S. Appl. No. 14/619,866.
Office Action dated Jan. 11, 2017 in U.S. Appl. No. 14/619,894.
Office Action dated Jan. 19, 2017 in U.S. Appl. No. 14/619,827.
Office Action dated Jan. 29, 2018 in U.S. Appl. No. 14/619,894.
Office Action dated Feb. 5, 2020 in U.S. Appl. No. 16/403,932.
Office Action dated Feb. 6, 2020 in CN Patent Application No. 201580076013.X.
Office Action dated Feb. 10, 2020 in U.S. Appl. No. 14/619,821.
Office Action dated Feb. 10, 2021 in U.S. Appl. No. 14/619,866.
Office Action dated Feb. 15, 2022 in U.S. Appl. No. 17/360,279.
Office Action dated Feb. 22, 2021 in CN Patent Application No. 201580076013.X.
Office Action dated Mar. 4, 2020 in CN Patent Application No. 201580075963.0.
Office Action dated Mar. 9, 2018 in U.S. Appl. No. 14/619,866.
Office Action dated Mar. 16, 2018 in U.S. Appl. No. 14/619,843.
Office Action dated Mar. 17, 2017 in U.S. Appl. No. 14/619,843.
Office Action dated Mar. 17, 2020 in U.S. Appl. No. 16/575,742.
Office Action dated Mar. 18, 2022 in U.S. Appl. No. 16/291,490.
Office Action dated Mar. 23, 2017 in U.S. Appl. No. 14/619,821.
Office Action dated Mar. 23, 2022 in U.S. Appl. No. 17/086,821.
Office Action dated Mar. 31, 2017 in U.S. Appl. No. 14/619,863.
Office Action dated Apr. 2, 2020 in CN Patent Application No. 201580075975.3.
Office Action dated Apr. 5, 2019 in U.S. Appl. No. 14/619,821.
Office Action dated Apr. 6, 2017 in U.S. Appl. No. 14/619,866.
Office Action dated Apr. 13, 2020 in CN Patent Application No. 201580076012.5.
Office Action dated May 6, 2019 in U.S. Appl. No. 14/619,843.
Office Action dated May 9, 2017 in U.S. Appl. No. 14/619,894.
Office Action dated Jun. 25, 2019 in KR Patent Application No. 10-2017-7025562.
Office Action dated Jul. 9, 2018 in U.S. Appl. No. 14/619,894.
Office Action dated Jul. 14, 2016 in U.S. Appl. No. 14/619,827.
Office Action dated Jul. 24, 2020 in U.S. Appl. No. 14/619,866.
Office Action dated Jul. 25, 2019 in CN Patent Application No. 201580075991.2.
Office Action dated Aug. 4, 2020 in JP Patent Application No. 2020-000441.
Office Action dated Aug. 22, 2019 in U.S. Appl. No. 14/619,843.
Office Action dated Aug. 27, 2018 in U.S. Appl. No. 14/619,821.
Office Action dated Aug. 28, 2018 in JP Patent Application No. 2017-542160.
Office Action dated Sep. 1, 2020 in CN Patent Application No. 201580076012.5.

(56) References Cited

OTHER PUBLICATIONS

Office Action dated Sep. 4, 2020 in CN Patent Application No. 201580076013.X.
Office Action dated Sep. 6, 2022 in JP Patent Application No. 2021-095995.
Office Action dated Sep. 12, 2016 in U.S. Appl. No. 14/619,843.
Office Action dated Sep. 14, 2016 in U.S. Appl. No. 14/619,866.
Office Action dated Sep. 14, 2022 in U.S. Appl. No. 17/026,950.
Office Action dated Sep. 20, 2017 in U.S. Appl. No. 14/619,821.
Office Action dated Sep. 27, 2022 in U.S. Appl. No. 16/291,490.
Office Action dated Oct. 12, 2020 in CN Patent Application No. 201580075963.0.
Office Action dated Oct. 18, 2022 in JP Patent Application No. 2020-000441.
Office Action dated Oct. 19, 2017 in U.S. Appl. No. 14/619,863.
Office Action dated Oct. 27, 2017 in U.S. Appl. No. 14/619,843.
Office Action dated Nov. 3, 2017 in U.S. Appl. No. 14/619,866.
Office Action dated Nov. 30, 2021 in U.S. Appl. No. 14/619,821.
Office Action dated Dec. 6, 2018 in U.S. Appl. No. 15/703,389.
Office Action dated Dec. 11, 2020 in CN Patent Application No. 201580075975.3.
Office Action dated Dec. 18, 2018 in KR Patent Application No. 10-2017-7025562.
Preliminary Opinion in Advance of Oral Proceedings dated Nov. 3, 2021 in EP Patent Application No. 15826281.6.
Summons to Attend Oral Proceedings dated Mar. 31, 2022 in EP Patent Application No. 15828463.8.
Summons to Attend Oral Proceedings dated Apr. 15, 2021 in EP Patent Application No. 15826281.6.
Office Action with English translation for German Application No. 11 2015 006 145.2, dated Nov. 6, 2023, 12 pages.

\* cited by examiner

METHODS, SYSTEMS, AND MEDIA FOR AMBIENT BACKGROUND NOISE MODIFICATION BASED ON MOOD AND/OR BEHAVIOR INFORMATION

CROSS-REFERENCE TO RELATED APPLICATIONS

This application is a continuation of U.S. patent application Ser. No. 17/086,821, filed Nov. 2, 2020, which is a continuation of U.S. patent application Ser. No. 16/575,742, filed Sep. 19, 2019, which is a continuation of U.S. patent application Ser. No. 15/703,389, filed Sep. 13, 2017, which is a continuation of U.S. patent application Ser. No. 14/619,827, filed Feb. 11, 2015, each of which is hereby incorporated by reference herein in its entirety.

This application is related to U.S. patent application Ser. No. 14/619,866, filed Feb. 11, 2015, U.S. patent application Ser. No. 14/619,894, filed Feb. 11, 2015, U.S. patent application Ser. No. 14/619,821, filed Feb. 11, 2015, U.S. patent application Ser. No. 14/619,843, filed Feb. 11, 2015, and U.S. patent application Ser. No. 14/619,863, filed Feb. 11, 2015, each of which is incorporated by reference herein in its entirety.

TECHNICAL FIELD

The disclosed subject matter relates to methods, systems, and media for ambient background noise modification based on mood and/or behavior information.

BACKGROUND

Users' homes are often filled with many devices, such as computers, televisions, stereos, refrigerators, smoke detectors, etc. Many of these devices emit sounds or noise, either as a primary function (e.g., when a television is turned on and presenting content) or as a byproduct (e.g., when a cooling fan is turned on and used to cool an associated device). Often, these noises are unwanted and can be problematic, for example, by distracting users from tasks they are performing.

Accordingly, it is desirable to provide methods, systems, and media for ambient background noise modification based on mood and/or behavior information.

SUMMARY

In accordance with some implementations of the disclosed subject matter, methods, systems, and media for ambient background noise modification based on mood and/or behavior information are provided.

In accordance with some implementations of the disclosed subject matter, a method for ambient background noise modification is provided, the method comprising: identifying at least one noise present in an environment of a user having a user device, an activity the user is currently engaged in, and a physical or emotional state of the user; determining a target ambient noise to be produced in the environment based at least in part on the identified noise, the activity the user is currently engaged in, and the physical or emotional state of the user; identifying at least one device associated with the user device to be used to produce the target ambient noise; determining sound outputs corresponding to each of the one or more identified devices, wherein a combination of the sound outputs produces an approximation of one or more characteristics of the target ambient noise; and causing the one or more identified devices to produce the determined sound outputs.

In accordance with some implementations of the disclosed subject matter, a system for ambient background noise modification is provided, the system comprising: a hardware processor that is programmed to: identify at least one noise present in an environment of a user having a user device, an activity the user is currently engaged in, and a physical or emotional state of the user; determine a target ambient noise to be produced in the environment based at least in part on the identified noise, the activity the user is currently engaged in, and the physical or emotional state of the user; identify at least one device associated with the user device to be used to produce the target ambient noise; determine sound outputs corresponding to each of the one or more identified devices, wherein a combination of the sound outputs produces an approximation of one or more characteristics of the target ambient noise; and cause the one or more identified devices to produce the determined sound outputs.

In accordance with some implementations of the disclosed subject matter, non-transitory computer-readable media containing computer executable instructions that, when executed by a processor, cause the processor to perform a method for ambient background noise modification are provided, the method comprising: identifying at least one noise present in an environment of a user having a user device, an activity the user is currently engaged in, and a physical or emotional state of the user; determining a target ambient noise to be produced in the environment based at least in part on the identified noise, the activity the user is currently engaged in, and the physical or emotional state of the user; identifying at least one device associated with the user device to be used to produce the target ambient noise; determining sound outputs corresponding to each of the one or more identified devices, wherein a combination of the sound outputs produces an approximation of one or more characteristics of the target ambient noise; and causing the one or more identified devices to produce the determined sound outputs.

In accordance with some implementations of the disclosed subject matter, a system for ambient background noise modification is provided, the system comprising: means for identifying at least one noise present in an environment of a user having a user device, an activity the user is currently engaged in, and a physical or emotional state of the user; means for determining a target ambient noise to be produced in the environment based at least in part on the identified noise, the activity the user is currently engaged in, and the physical or emotional state of the user; means for identifying at least one device associated with the user device to be used to produce the target ambient noise; means for determining sound outputs corresponding to each of the one or more identified devices, wherein a combination of the sound outputs produces an approximation of one or more characteristics of the target ambient noise; and means for causing the one or more identified devices to produce the determined sound outputs.

In some implementations, the system further comprises means for determining sound output capabilities associated with the identified devices associated with the user device.

In some implementations, determining sound outputs corresponding to each of the identified devices is based at least in part on the determined sound output capabilities.

In some implementations, the determined sound outputs comprise a modulation of a speed of a fan associated with at least one of the identified devices.

In some implementations, the determined sound outputs are to be produced through an audio output associated with at least one of the identified devices.

In some implementations, the system further comprises means for determining a sound level associated with the noises present in the environment.

In some implementations, the target ambient noise comprises the noises present in the environment at a lower sound level relative to the determined sound level associated with the noises present in the environment.

In some implementations, the system further comprises: means for receiving user feedback related to the determined target ambient noise; and means for determining that the sound outputs are to be produced based on the received user feedback.

In some implementations, each of the sound outputs has an associated rating, and the system further comprises: means for retrieving the rating associated with the sound outputs; and means for modifying the rating based on the received user feedback.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify the like elements.

DETAILED DESCRIPTION

Figure 1:
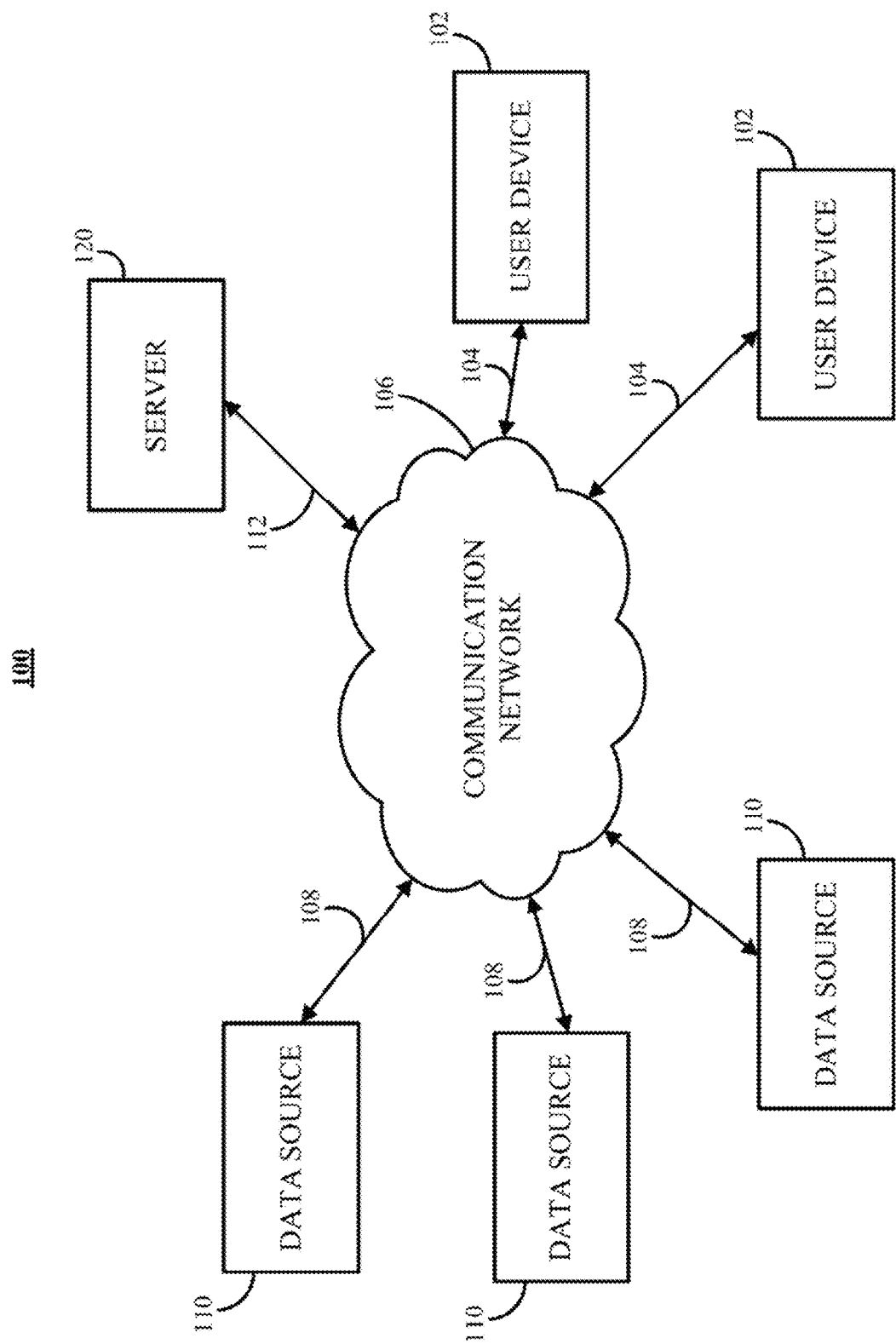
FIG. 1 shows an example of a generalized schematic diagram of a system on which the mechanisms for personalizing computerized services based on mood and/or behavior information from multiple data sources in accordance with some implementations of the disclosed subject matter.

In accordance with some implementations, as described in more detail below, mechanisms, which can include methods, systems, and/or computer readable media, for personalizing computerized services based on mood and/or behavior information from multiple data sources are provided.

Generally speaking, these mechanisms can receive inputs from a user of a user device relating to a particular objective for that user and, based on received data that relates to the user, can provide personalized and computerized services that may assist the user in reaching that particular objective. For example, the user of the user device may indicate via a user interface a desire to incorporate more exercise during the course of a workday and, based on data relating to the user from one or more data sources for which the user has affirmatively given consent, the mechanisms can recommend one or more actions that may technologically assist the user in reaching the particular objective—e.g., by recommending through an automatic mobile alert or notification that the user walk to the office today based on weather information, scheduling constraints based on an online calendar, and/or traffic and public transportation information received through one or more computer networks; by recommending that the user who has a particular interest in flowers visit a gardening vendor along the user's route as identified by a computer map routing service (e.g., Google Maps); etc.

It should be noted that, additionally or alternatively to receiving an input relating to a particular objective, the mechanisms can receive user feedback and, based on the received user feedback, determine goals for the user. For example, the user may indicate a lack of energy on weekdays via a user interface on the user device and the mechanisms can interpret such an indication and determine various goals for the user, such as increasing the amount of exercise-related activities. In another example, the user can be provided with an interface that requests the user provides feedback as to the user's general mood, emotional state, and/or behavioral disposition and the mechanisms can determine goals for the user based on the provided feedback. Illustrative examples of goals that can be determined for a user and/or associated with a user device can include reducing stress from a currently indicated stress level, generally losing weight, losing ten pounds, attaining a particular mood or emotional state (e.g., relaxed, lively, etc.), increasing the amount of exercise that the user currently achieves, making more friends, and/or any other suitable goal relating to the user's general mood, emotional state, and/or behavioral disposition.

It should also be noted that, prior to analyzing data relating to the user from multiple data sources, determining a mood, emotional state, and/or behavioral disposition associated with the user, and/or recommending one or more actions to the user, the mechanisms can request (or require) that the user affirmatively provide consent or authorization to perform such determinations. For example, upon loading an application on a mobile device, the application can prompt the user to provide authorization for receiving information from one or more data sources, performing such determinations, and/or recommending one or more actions to the user. In a more particular example, in response to downloading the application and loading the application on the mobile device, the application executing on the mobile device can perform device discovery functions to determine devices that are connected to or nearby the mobile device, such as a media playback device that includes media data (e.g., watch history, recorded media content information, etc.) and/or a scent generator that includes an activity and/or light sensor for obtaining information relating to the environment around the connected mobile device. The application can then present the user with an interface that requests (or requires) that the user affirmatively provide consent to accessing information from these devices by selecting the one or more devices or data sources for receiving information relating to the user that can be used to determine a mood, emotional state, and/or behavioral disposition associated with the user, determine one or more goals or objectives associated with the user, and/or recommend one or more actions that may impact the physical state, emotional state, and/or behavioral disposition associated with the user. Additionally or alternatively, in response to installing the application on the mobile device, the user can be prompted with a permission message that requests (or requires) that the user affirmatively provide consent prior to receiving information from one or more data sources, performing such determinations, and/or recommending one or more actions to the user.

Upon receiving consent and/or authorization, the mechanisms can receive any suitable data relating to the user from multiple data sources. Such data can include contextual data, social data, personal data, etc. For example, the mechanisms can predict a current mood state for the user based on content and/or information published by the user on a social networking service (e.g., using a social networking application on the user device), biometric data associated with the user (e.g., from a wearable computing device associated with a user account), location data associated with the user (e.g., from the user device), and/or any other suitable data indicative of current mood and/or behavior of the user. In another example, the mechanisms can determine particular activities that the user has engaged in, such as attending a social event (e.g., a conference, a party, a sports event, etc. from an online calendar), consuming a media content item (e.g., a video clip, a song, a news article, a webpage, etc.), interacting with a computing device (e.g., a mobile phone, a wearable computing device, a tablet computer, etc.), interacting with an application (e.g., a media playback application, a social networking application, a messaging application, a web browser, etc. on a user device), and/or any other suitable activity. This activity data can, for example, be used to determine reference behaviors associated with the user (e.g., a particular time and portion of the day is typically spent watching videos on a media playback application executing on a mobile device).

In some implementations, based on data relating to the user that is received from one or more data sources for which the user has affirmatively provided consent, the mechanisms can recommend one or more computerized actions that may assist the user in reaching one or more of the objectives and/or goals. For example, the mechanisms can use device discovery functions to determine which output devices for executing the one or more recommended actions are connected to the mobile device or are proximate to the mobile device, such as devices having a speaker that are capable of playing audio content, devices having a display that are capable of presenting video content, lighting systems that are capable of providing a particular lighting scheme, and scent generators that are capable of emitting a particular scent. In response, these mechanisms can transmit instructions to an output device that is capable of executing a recommended action. For example, in response to determining information indicative of the user's general mood, emotional state, and/or behavioral disposition from one or more data sources, the mechanisms can identify one or more activities that, if performed, may move the user towards a particular objective or goal. In this example, the mechanisms can transmit a message or other suitable interface indicating the recommended activities to the mobile device associated with the user.

In a more particular example, in response to receiving social networking data from a social media application that indicates the user may be experiencing low energy levels (e.g., analyzing text from a post using the social media application) and online calendar data that includes scheduling information associated with a user for a given day, the mechanisms can recommend one or more computerized actions to the user that may assist the user in reaching one or more of the determined goals. The mechanisms can review a route to an event listed in the calendar data, where the route has been identified by a computer map routing service, and transmit an interface to be presented on the mobile device associated with the user, where the interface recommends that the user walk to the event and visit a particular juice vendor along the route as identified by a computer map routing service.

Additionally or alternatively to a recommendation interface that includes a message or other suitable content, personalized and computerized services can include a determination that a particular atmosphere should be created that may affect the user's general mood, emotional state, and/or behavioral disposition. In one particular example, the atmosphere can include causing particular content to be automatically played back (e.g., a particular song that is designated as being inspirational to users), causing a news feed of articles that are designated as positive stories to be presented, causing photographs or other image content that are designated as amusing to users to be presented, and sound effects that are designated as having a relaxing effect on users, to be presented to the user on an associated user device (e.g., mobile device, television device, etc.). In another particular example, the atmosphere can be created by accessing a lighting system associated with the user or user device and causing particular light sources to switch on or off, select the level of light emitted from particular lighting devices, and/or select the color temperature of particular light sources, thereby modifying the lighting scheme in the user's surroundings. In yet another example, the atmosphere can be created by modifying an ambient noise emitted by a device connected to the user device (e.g., modifying the speed of a fan on a computing device associated with the user), emitting a particular scent from a device connected to the user device (e.g., causing a device that is capable of emitting particular scents and that is within a particular proximity of the user of the user device to emit a lavender scent), controlling an appliance or a home automation device connected to the user device (e.g., controlling the compressor of an HVAC unit or modifying the speed of the drum of a washer), etc.

In some implementations, the mechanisms can generate one or more profiles associated with a user device. For example, in some implementations, the mechanisms can generate various profiles that can be used to determine recommended actions suitable for the user of the user device. For example, the mechanisms can generate a profile that is indicative of the user's current mood, emotional state, and/or behavioral disposition and compare the generated profile with a target profile to determine a recommended action that, if performed, may move the user towards an objective or goal. In a more particular example, the target profile can be generated based on profiles or other actions of users that have indicated the achievement of a particular objective or goal (e.g., users that deem themselves to be highly successful, users that have lost five pounds in the past 30 days, etc.). In this example, the mechanisms can determine actions that are performed by users of user devices determined to have achieved a particular objective or goal and can determine whether one or more of these actions can be recommended to the user so that the user also achieves the particular objective or goal.

These and other features are further described in connection with FIGS. 1-14.

Turning to FIG. 1, FIG. 1 shows an example 100 of a generalized schematic diagram of a system on which the mechanisms for personalizing computerized services based on mood and/or behavior information from multiple data sources can be implemented in accordance with some implementations of the disclosed subject matter. As illustrated, system 100 can include one or more user devices 102. User devices 102 can be local to each other or remote from each other. User devices 102 can be connected by one or more communications links 104 to a communication network 106 that can, in turn, be linked to a server 120 via a communications link 112.

System 100 can include one or more data sources 110. Data source 110 can be any suitable device that can gather and/or provide data relating to a user or a user device.

For example, data source 110 can include any suitable sensor that can gather and/or provide data relating to a user, such as an image sensor (e.g., a camera, a video recorder, etc.), an audio sensor (e.g., a microphone, a sound lever meter, etc.), a radio-frequency identification (RFID) sensor, a Global Positioning System (GPS), a sensor that is capable of measuring one or more biological parameters (e.g., a heart rate, a respiration rate, a blood pressure, a body temperature, skin moisture, etc.), a wearable pedometer, a Wi-Fi router, etc. In a more particular example, data source 110 can be multiple sensors connected to a home automation system registered to a user account associated with the user, where different data streams relating to the environment in the user's home can be received. In another more particular example, data source 110 can include multiple sensors connected to a coffee shop that is local to the user and an application program interface that allows the recommendation system to request data relating to the local coffee shop (e.g., how many patrons are currently in the shop based on a door sensor, how many patrons are currently waiting in line to order in the shop based on an image sensor, whether a group that the user is assigned is likely to visit the shop by comparing a target profile with a customer profile associated with the shop, etc.). In yet another more particular example, data source 110 can include one or more sound level sensors in a user's environment that can detect sound and/or noise present in the user environment and can measure a sound level (e.g., in dB, and/or any other suitable metric) associated with the detected sound, as described below in connection with FIGS. 12 and 13.

In another example, data source 110 can include a computing device, such as a desktop, a laptop, a mobile phone, a tablet computer, a wearable computing device, etc. Examples of data provided by such a computing device can include user generated data (e.g., text inputs, photos, touch inputs, etc.), user application generated data (e.g., data provided by a social networking application, a messaging application, a photo sharing application, a video sharing application, a media player application, etc.), data generated by one or more sensors resident on the computing device (e.g., an image sensor, a GPS, a sensor that is capable of measuring one or more biological parameters, etc.), and/or any other suitable data relating to the user. For example, data source 110 can include a computing device that has been registered to a user having a user account and data can include data from various applications installed on the computing device and registered using the same user account. In this example, the user of the computing device can select which applications or which data types (e.g., location data, wireless network data, etc.) is used by an application executing on user device 102 or server 120.

In yet another example, data source 110 can include one or more services that can provide data related to the user. Such services can include, for example, a social networking service, a messaging service, a video sharing service, a photo sharing service, a file hosting service, etc. In such an example, user device 102 or server 120 can communicate with data source 110 via one or more application programming interfaces and/or any other suitable data exchange mechanisms.

It should be noted that data from one or more data sources 110 can be used to determine the impact of a recommended action on a user's physical or emotional state. The emotional state of a user can be a complex phenomenon. Emotion can be a mental state that is associated with physiological activity and can be influenced by internal or external environmental conditions. Emotion can be associated with personality, mood, temperament, disposition, and motivation of a user. For example, emotional states can include happiness, contentment, tranquility, surprise, anger, fear, sadness, depression, disgust, tired, anxious, hurried, etc. In some examples, emotional states can be broadly classified into positive and negative emotions, where positive emotions can include happiness and contentment and negative emotions can include anger and depression. In addition, an example of an internal environmental condition includes an old memory and an example of external stimulus includes stress or the relief of stress due to various environmental factors.

It should also be noted that the physical or emotional state of a user can be considered an overall snapshot or view of the user's physical characteristics or emotions at a point in time. Because multiple factors can be involved in a user's physical or emotional state, the physical or emotional state can fluctuate even over short periods of time. By using data relating to the user from multiple sources, a user's physical or emotional state can be predicted, which can be used to determine whether to recommend a particular action at a given time. Moreover, changes to a user's physical or emotional state can be predicted based on new or updated data relating to the user from multiple sources. Even further, changes to a user's physical or emotional state can be used to evaluate whether recommended actions to devices possessed by, or located proximate to, the user may be moving the user towards a goal or objective.

Data sources 110 can be local to each other or remote from each other. Each data source 110 can be connected by one or more communications links 108 to communication network 106 that can, in turn, be linked to server 120 via communications link 112 and/or user device 102 via communications link 104.

It should be noted that, in some implementations, prior to accessing information from various data sources 110, user device 102 can request (or require) that the user of user device 102 provide authorization to access each of the various data sources 110. In some implementations, user device 102 can detect data sources 110 that are available to provide data relating to the user and can provide a user interface that allows the user of user device 102 to select which data sources 110 are to be used for obtaining data relating to the user.

Figure 2:
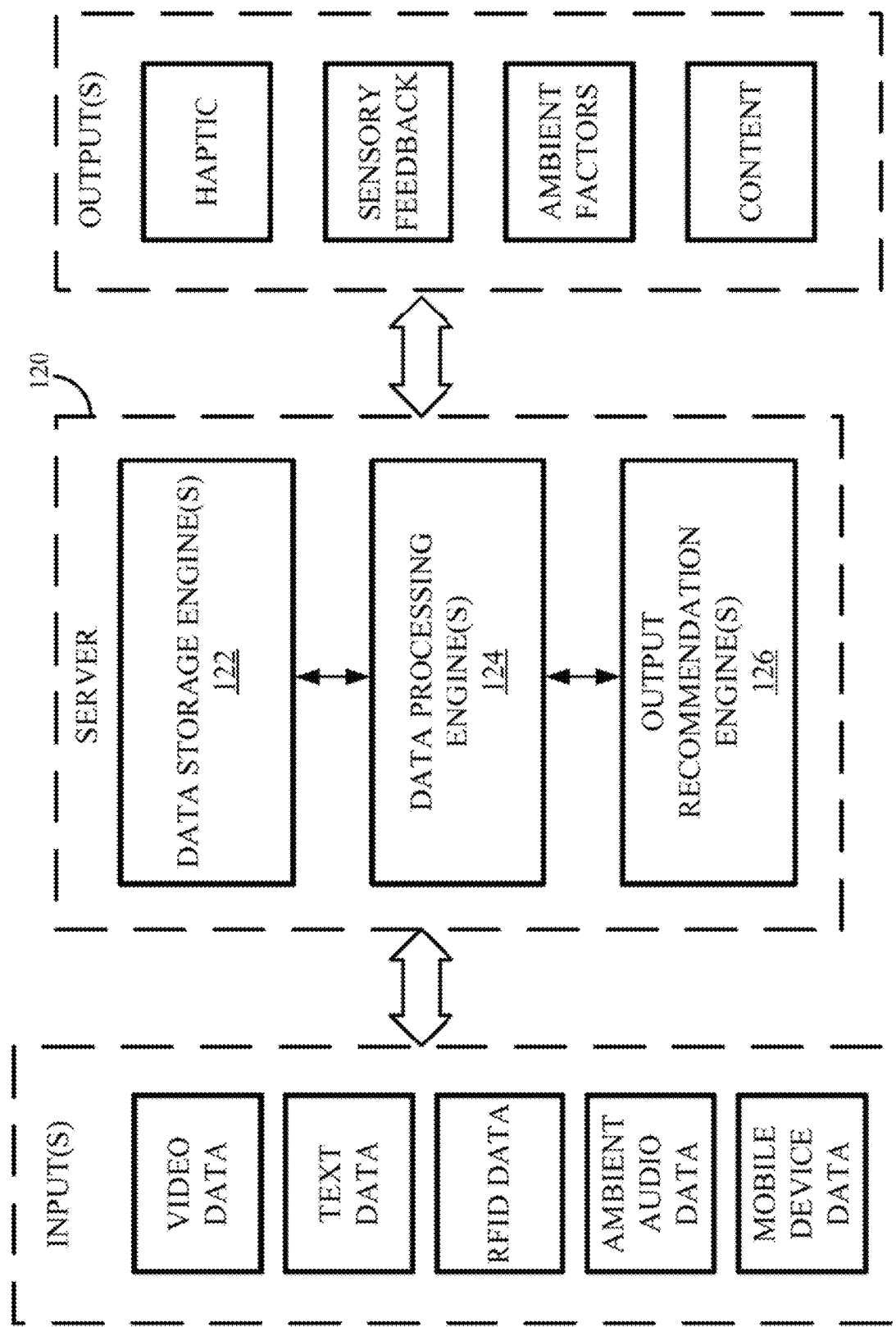
FIG. 2 shows a more particular example of a server of FIG. 1 that can receive various types of data from multiple data sources and that can recommend various types of actions based on a portion of the received data to various user devices associated with a user device in accordance with some implementations of the disclosed subject matter.

FIG. 2 shows an illustrative example of types of input data that can be received by user device 102 and/or server 120. As shown in FIG. 2, server 120 can include a data storage engine 122 for requesting, consolidating, storing, and/or processing data relating to a user or a group of users and a data processing engine 124 for categorizing received data (e.g., contextual data, social data, general data, etc.), selecting particular portions of data that may be indicative of a physical or emotional state of the user, and processing the selected portions of data. For example, as also shown in FIG. 2, server 120 can receive, among other things, various types of video data, text data, RFID data, ambient audio data (or keywords extracted from ambient audio data), and mobile device data.

Using one or more data sources 110, data storage engine 122 can receive any suitable data. For example, from one or more data sources 110, data storage engine 112 can receive and/or request data relating to activities engaged in by one or more users, such as "took a walk" and the distance traversed, visited a location that corresponds with a coffee shop, attended a social event (e.g., a conference, a party, a sporting event, etc.), attended a fitness training session, etc. As another example, from one or more data sources 110, data storage engine 112 can receive and/or request data that includes timing information related to an activity, such as a duration of the activity, a time corresponding to the activity, etc. As yet another example, data storage engine 112 can receive and/or request data that includes a number of occurrences of an activity engaged in by one or more users during a given time period (e.g., a day of the week, a couple of days, weekdays, weekends, etc.), a number of users that engage in a given activity, and/or any other suitable information relating to frequency information related to a given activity. As still another example, in some implementations, data storage engine 122 can receive information indicating noise and/or sounds present in a user's environment. As a more particular example, in some implementations, the information can indicate that a media playback device (e.g., a television, a stereo, and/or any other suitable media playback device) is on in the user's environment, that a fan associated with a particular device (e.g., a computer, a refrigerator, and/or any other suitable device) is running in the user's environment, that a conversation is occurring in the user's environment, and/or any other suitable information.

Using one or more data sources 110 that include social data sources, data storage engine 122 can receive and/or request data relating to content and/or information published by the user on a social networking service. For example, the data can include one or more mood states published by a user on a service (e.g., a social networking service, a messaging service, a video sharing service, a photo sharing service, an electronic commerce service, etc.). As another example, the data can include comments, messages, posts, locations, and/or any other suitable content published by the user on a social networking service. As still another example, the data can include any suitable information relating to one or more social connections of the user on a social networking service, content posted by the social connections, locations associated with the social connections, etc.

Using one or more data sources 110, data storage engine 112 can receive and/or request data relating to user interactions with one or more media content items. For example, the data can include any suitable information relating to a media content item with which the user has interacted. In a more particular example, the data can include a type of the media content item, a description of the media content item, a link to the media content item (e.g., a URL), an identifier that can identify the media content item (e.g., a URI, a program identifier, etc.), an author of the media content item, an artist related to the media content item, etc. As another example, the data can include any suitable information about a type of a user interaction with a media content item, such as consuming the media content item, publishing the media content item via a social networking service or any other suitable service, sharing the media content item with other users, liking the media content item via a social networking service or any other suitable service, commenting on the media content item, etc. As yet another example, the data can include any suitable timing information related to a user interaction with a media content item, such as a duration of the user interaction, a time corresponding to the user interaction, etc.

Using one or more data sources 110, data storage engine 112 can receive and/or request biometric data associated with the user. For example, in response to receiving authorization to access biometric data from data source 110 that includes a sensor, the biometric data can include any suitable physiological parameter associated with the user, such as a heart rate, a respiration rate, a blood pressure, a body temperature, skin moisture, etc. As another example, the biometric data can include a range of physiological parameters, such as a heart rate range, a blood pressure range, etc.

Using one or more data sources 110, data storage engine 112 can receive and/or request location data associated with the user. For example, in response to receiving authorization to access location information, the location data can include any suitable information that can be used to estimate a location of a computing device associated with the user, such as an identifier associated with the computing device (e.g., an IP address, GPS signals generated by the computing device, Wi-Fi access points associated with the computing device, information about a cell tower to which the computing device is connected, etc. As another example, the location data can include any suitable information that can be used to estimate a location of the user, such as a location published by the user using a suitable service (e.g., a social networking service), a location that a user intends to visit (e.g., a location associated with a social event scheduled using a calendar application executing on a mobile device, a social network account associated with the user, etc.), etc.

In some implementations, data storage engine 112 can categorize and/or classify data received from data sources 110.

For example, data storage engine 122 can receive data from multiple data sources 110 (e.g., using one or more application programming interfaces) and data processing engine 124 can classify the received data as general data when the received data includes information about one or more services used by a user (e.g., a social networking service, an email service, a messaging service, a video sharing service, etc.), search history associated with a user (e.g., keywords inputted by the user), etc.

As another example, data storage engine 122 can receive data from multiple data sources 110 (e.g., using one or more application programming interfaces) and data processing engine 124 can classify the received data as contextual data when the received data includes information about a location of user device 102, traffic information, weather information based on location information from user device 102 (e.g., "sunny," "cold," etc.), population density information within a given location, a location context relating to data provided by a data source 110 (e.g., "work," "home," "vacation," etc.), and/or any other suitable information that can provide contextual information related to the user.

As yet another example, data storage engine 122 can receive data from multiple data sources 110 (e.g., using one or more application programming interfaces) and data processing engine 124 can classify the received data as social data when the received data stream includes information related to social events involving multiple users (e.g., a conference scheduled using a social networking service, a calendar application, etc.), content and/or information published by one or more users using a service (e.g., a social networking service, a video sharing service, a photo sharing service, etc.), information about one or more social connections of a user, and/or any other suitable information that can be classified as social data. In a more particular example, social data associated with a user account of a social service can be retrieved in response to determining that the user account is also authenticated on user device 102.

As still another example, data storage engine 122 can receive data from multiple data sources 110 (e.g., using one or more application programming interfaces) and data processing engine 124 can classify the received data as personal data when the received data stream includes information about user goals, personal interests of a user (e.g., a user's stated interest available on a social networking service, media content consumed and/or liked by a user, etc.), one or more utterances generated by a user, and/or any other suitable information that can be regarded as personal. In this example, data processing engine 124 can discard personal data unless specific authorization to use such personal data is received from the user of user device 102.

In some implementations, data processing engine 124 can process data streams that are provided by data source 110 and/or that are stored and/or processed by data storage engine 122.

In some implementations, data processing engine 124 can determine whether data or a particular portion of data from data source 110 is relevant to a goal or objective of the user. It should be noted that, in some implementations, data processing engine 124 can determine whether data or a particular portion of data from multiple data sources 110 is relevant to a goal or objective of users assigned to a particular group of users.

In some implementations, data processing engine 124 can determine whether data or a particular portion of data from data source 110 is indicative of the emotional state of the user. These determinations can be made in any suitable manner. For example, the determination can be made using a suitable classifier that can classify input data or a portion of input data as being relevant to a goal or as being irrelevant to the goal.

In a more particular example, data processing engine 124 can select one or more portions of data, where each portion of data can correspond to any suitable period of time, such as a few minutes, a couple of hours, a day of the week, a couple of days, a week, a month, etc. In some implementations, the portions of data can be identified in any suitable manner. For example, a determination can be made using a classifier that can classify a portion of data as being relevant to a goal. In another example, a determination can be made using a classifier that can classify a portion of data as likely to be indicative of a user's emotional state. In yet another example, a determination can be made using a classifier that can classify a portion of data as being relevant to a recommended action (e.g., data that can be used to determine the likelihood that the action may impact the user's emotional state, data that can be used to determine when the recommended action is to be executed, etc.). It should be noted that the classifier can be trained using any suitable machine learning algorithm, such as a support vector machine, a decision tree, a Bayesian model, etc.

In some implementations, upon selecting various portions of data from multiple data sources 110, data processing engine 124 can assign a weight to each of the portions of data. For example, for a particular goal or objective, data processing engine 124 can determine that social data from particular data sources 110 is to be weighted such that it has more influence on the determination of the recommended action or output. This may be because social data that relates to the user and that is indicative of the user's emotional state is considered highly relevant to the objective of making new friends. In another example, this may be because social data tends to provide an accurate indication of the user's emotional state (e.g., as the user of the user devices frequently posts status updates on multiple social networking websites) and because, prior to recommending a particular action, such as driving a vehicle to a particular location, data processing engine 124 may take into account such social data. In another suitable example, weights can be set by the user of user device 102 such that the user can tune the application and how particular types of data relating to the user are processed. In a more particular example, the user can set weights associated with social data such that the effect of social data in the determination of an action or output is reduced.

In some implementations, data processing engine 124 can generate one or more profiles relating to the user. For example, data processing engine 124 can use the received data to generate a baseline profile that is used to assign the user of user device 102 to a group (e.g., a group of similar users for the particular objective or goal). In this example, data processing engine 124 can also generate a target profile for the individual user and/or the group of users, which can include data corresponding to similar users that have indicated an achievement of the particular objective or goal. Alternatively, data processing engine 124 can generate a target profile that includes data corresponding to similar users that have indicated a failure to attain the particular objective or goal. As another example, data processing engine 124 can use the received data and, in some implementations, request and receive updated data to generate a current profile associated with the user that is indicative of the user's current physical or emotional state.

Any suitable profile relating to the user of user device 102 or a group of users can be generated using any suitable approach. For example, data processing engine 124 can generate one or more profiles that are indicative of the user's physical or emotional state over a given time period. For example, a baseline profile associated with a user can be generated based on data that is determined to be indicative of the user's physical or emotional state during a given time period, such as mornings, a given day, weekdays, weekends, a given week, a season, and/or any other suitable time period. In another example, data processing engine 124 can generate one or more profiles that are indicative of the user's physical or emotional state for a given context, such as a typical work day, a vacation day, mood and/or behavior when user device 102 is located in the proximity of the user's home, mood and/or behavior when user device 102 indicates that the temperature in the proximity of user device 102 is below 65 degrees, etc.

In some implementations, server 120 can include an output recommendation engine 126 for determining and/or providing a recommended action that may affect or impact the physical or emotional state of the user. For example, in response to comparing a current profile corresponding to the user with a target profile, output recommendation engine 126 can determine a recommended action for the user. In a more particular example, output recommendation engine 126 can, based on comparing the current profile indicating that the user has a particular objective and a target profile of similar users that includes information relating to users where it has been determined that they have achieved the particular objective and information relating to users where it has been determined that they have not achieved the particular objective, determine one or more recommended actions that can impact the physical or emotional state of the user and, upon performing the recommended action, may assist the user in reaching the particular objective.

It should be noted that, in some implementations, output recommendation engine 126 can cause any suitable recommended action to be executed on user device 102 or any other suitable computing device associated with the user. As shown in FIG. 2, the action or output can include, among other things, a haptic or touch sensitive feedback, a sensory feedback (e.g., image content, light cues, music, video messages, video content, etc.), an ambient-related feedback (e.g., causing a scent to be emitted from a suitable device, modifying a lighting scheme by a lighting or home automation system, causing an ambient noise in the user's environment to be altered, etc.), and/or a content-related action (e.g., presenting text, image content, video content, audio content).

For example, output recommendation engine 126 can determine that a message is to be presented to user device 102 associated with the user to prompt the user to engage in an activity. This may, for example, assist the user in reaching a particular objective or goal. In a more particular example, output recommendation engine 126 can determine that the message is to be presented in a particular form (e.g., by email, text message, mobile notification, account notification, a user interface, and/or in any other suitable manner) and/or at a particular time (e.g., based on the current physical or emotional state of the user).

As another example, output recommendation engine 126 can determine that an atmosphere is to be created in the proximity of the user. This may, for example, assist the user in reaching a particular objective or goal and/or affect the determined emotional state of the user. In a more particular example, based on a determination of the user's current physical or emotional state, output recommendation engine 126 can cause music content, a feed of news articles that have been designated as being positive content, and/or a feed of image content that have been designed as being amusing content to be presented on user device 102 associated with the user. In another more particular example, output recommendation engine 126 can cause a sound effect (e.g., rain sounds) to be presented on a device having an audio output device that is connected to the user device, can cause ambient light in the user's surroundings to be adjusted using a lighting system connected to the user device, and/or can cause a scent to be emitted by actuating a scent generator in a proximity of the user using user device 102.

As yet another example, output recommendation engine 126 can determine that an ambient noise in a user's environment is to be modified. In some implementations, the ambient noise can be altered to assist a user in performing a particular activity, to improve a user's mood and/or physical state, and/or for any other suitable reason. As a particular example, in some implementations, in instances where it is determined that a user is working, output recommendation engine 126 can determine an ambient noise in the user's environment that will assist the user in concentrating on working. As a specific example, output recommendation engine 126 can determine that the ambient noise is to be white noise. As another specific example, in response to determining that the user is feeling sleepy while working, output recommendation engine 126 can determine that the ambient noise is to fluctuate (e.g., in frequency and/or volume) over a particular time period to alert the user. These and other examples are discussed in more detail below in connection with FIGS. 12-14.

Referring to FIG. 1, any suitable user device 102 can be used to execute a recommended action from output recommendation engine 126. For example, user device 102 can be a wearable computing device, a television, a monitor, a liquid crystal display, a three-dimensional display, a touchscreen, a simulated touch screen, a gaming system, a portable DVD player, a portable gaming device, a mobile phone, a personal digital assistant (PDA), a music player, a tablet, a laptop computer, a desktop computer, a mobile phone, a media player, a lighting device, a scent generator, and/or any other suitable device that can be used to perform one or more recommended actions. It should be noted that, in some implementations, user device 102 can have an application programming interface such that the recommended output determined by output recommendation engine 126 can be transmitted to a suitable system, such as a home automation system, where the system uses the application programming interface to cause the recommended output to be executed on one or more user devices 102.

In a more particular example, server 120 can determine that a user associated with a user device has a particular objective or goal (e.g., getting more exercise during the course of the user's workday). In response to receiving authorization from the user of user device 102 to access social networking data, location data, and calendar data from various devices and other data sources, server 120 can determine that the user of the user device is currently feeling relatively low energy based on the social data and that the user has a meeting that is scheduled at a particular time and that is taking place at a particular location from the calendar data (with no obligations between the current time and the time of the meeting). Server 120 can use such data and take into account historical data. For example, based on biometric data from a wearable pedometer associated with the user, server 120 can determine the amount of activity that the user of user device 102 has engaged in that month to date or week to date and determine whether the user is likely to meet an indicated objective or goal or likely to meet an average activity level. In another example, based on location information, server 120 can determine the frequency that the user uses a car service to attend meetings at a particular location that is ten blocks away from a work location associated with the user. In yet another example, based on stated interests and/or affinities on a social networking service, server 120 can determine that the user of user device 102 likes flowers. In a further example, using mapping data that determines a route between the work location associated with the user and the location of the meeting. Taking into account these portions of data from multiple devices and/or data sources, server 120 can cause one or more recommended actions to be executed on one or more devices, such as a notification to a user device that prompts the user to purchase a cup of coffee from a nearby coffee shop in five minutes, a notification to a user device that prompts the user to walk to the meeting using a particular route that includes an option to visit an orchid shop that recently opened in a location that is along the provided route. Alternatively, server 120 can, at a particular time prior to the meeting, cause a scent generator located in proximity of user device 102 to emit a lavender scent. In another alternative example, server 120 can, at a particular time prior to the meeting, determine the weather in proximity of user device 102 prior to causing a notification that prompts the user to walk to the meeting using a particular walk (e.g., upon determining that the chance of precipitation is greater than a particular threshold value, upon determining that it is "too hot" for the user based on the determined temperature and user data as to what is considered "too hot," etc.).

Continuing with this example, server 120 can determine that the user of the user device has visited the orchid shop and/or that the user is walking to the coffee shop as recommended by the recommended action and server 120 can use an application programming interface of the coffee shop to request the number of consumers in the coffee shop and can determine that the user may have a particular waiting time at the coffee shop. Server 120 can then determine, using its respective application programming interface, that another coffee shop within the same franchise has a lesser waiting time and is close to the user of user device 102 (e.g., a block away from the current location provided by user device 102). Server 120 can transmit an updated or revised recommended action to user device 102.

In some implementations, it should be noted that server 120 can identify one or more user devices 102 or other suitable devices for executing a recommended action that are in a particular proximity of the user (e.g., a television, an audio system, a media player, a scent generator, a lighting system, etc.). For example, server 120 can cause user device 102 to detect devices that are connected to user device 102 and detect devices that are in proximity of user device 102 (e.g., using device discovery functions). In response, server 120 can cause a song that is deemed to be a relaxing song to be streamed from a service (e.g., a media streaming service) and output using a device (e.g., a mobile phone, a media player, etc.) associated with the user. In addition, server 120 can cause a lavender scent to be emitted using a scent generator at a particular time in response determining that the user likes lavenders (e.g., based on information published on the user's social network page) and based on the current emotional state of the user.

In some implementations, server 120 can personalize services for multiple users that each have a corresponding user device based on the combined physical or emotional state of the users. For example, the users can be a group of users having user devices that are in the same location (e.g., a coffee shop, a conference room, proximity of a given user, a town, an office, etc. based on location information or an online calendar), a group of users having user devices that are connected to each other on a social networking service, a group of users having user devices that are determined to be similar users, and/or any other suitable users.

Referring back to FIG. 1, system 100 can include one or more servers 120. Server 120 can be any suitable server or servers for providing access to the mechanisms described herein for personalizing services based on mood and/or behavior information from multiple data sources, such as a processor, a computer, a data processing device, or any suitable combination of such devices. For example, the mechanisms for personalizing services based on mood and/or behavior information from multiple data sources can be distributed into multiple backend components and multiple frontend components and/or user interfaces. In a more particular example, backend components (such as mechanisms for identifying an objective for a user, selecting particular portions of data from one or more data streams, generating profile information, determining recommended actions for one or more devices associated with the user, etc.) can be performed on one or more servers 120. In another more particular example, frontend components (such as presentation of a recommended action in the form of content, executing a recommended action, detecting that a user device is near other devices, etc.) can be performed on one or more user devices 102 and/or display devices 110.

In some implementations, each of user devices 102, data sources 110 and server 120 can be any of a general purpose device, such as a computer, or a special purpose device, such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, user device 102 can be implemented as a smartphone, a tablet computer, a wearable computer, a vehicle computing and/or entertainment system (e.g., as used in a car, a boat, an airplane, or any other suitable vehicle), a laptop computer, a portable game console, a television, a set-top box, a digital media receiver, a game console, a thermostat, a home automation system, an appliance, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), a peer-to-peer connection, etc. Each of communications links 104, 108, and 112 can be any communications links suitable for communicating data among user devices 102, data sources 110, and server 120, such as network links, dial-up links, wireless links, hard-wired links, any other suitable communications links, or any suitable combination of such links. Note that, in some implementations, multiple servers 120 can be used to provide access to different mechanisms associated with the mechanisms described herein for personalizing services based on mood and/or behavior information from multiple data sources. For example, system 100 can include: a data selection server 120 that facilitates the selection of data from multiple data sources that is indicative of an emotional state of the user; a profile server 120 that generates a baseline profile to assign the user into a group of users, determines a target profile based on the assigned group of user and based on the objectives or goals of the user, generates a current profile representing the user, and compares the current profile with the target profile; a recommendation server 120 that determines one or more recommended actions that may have a likelihood of impacting the emotional state of the user and/or may move the user towards an objective or goal; a delivery server 120 that causes the recommended action to be executed (e.g., transmit content to a particular device, transmit instructions to a home automation system, etc.); and/or any other suitable servers for performing any suitable functions of the mechanisms described herein.

Figure 3:
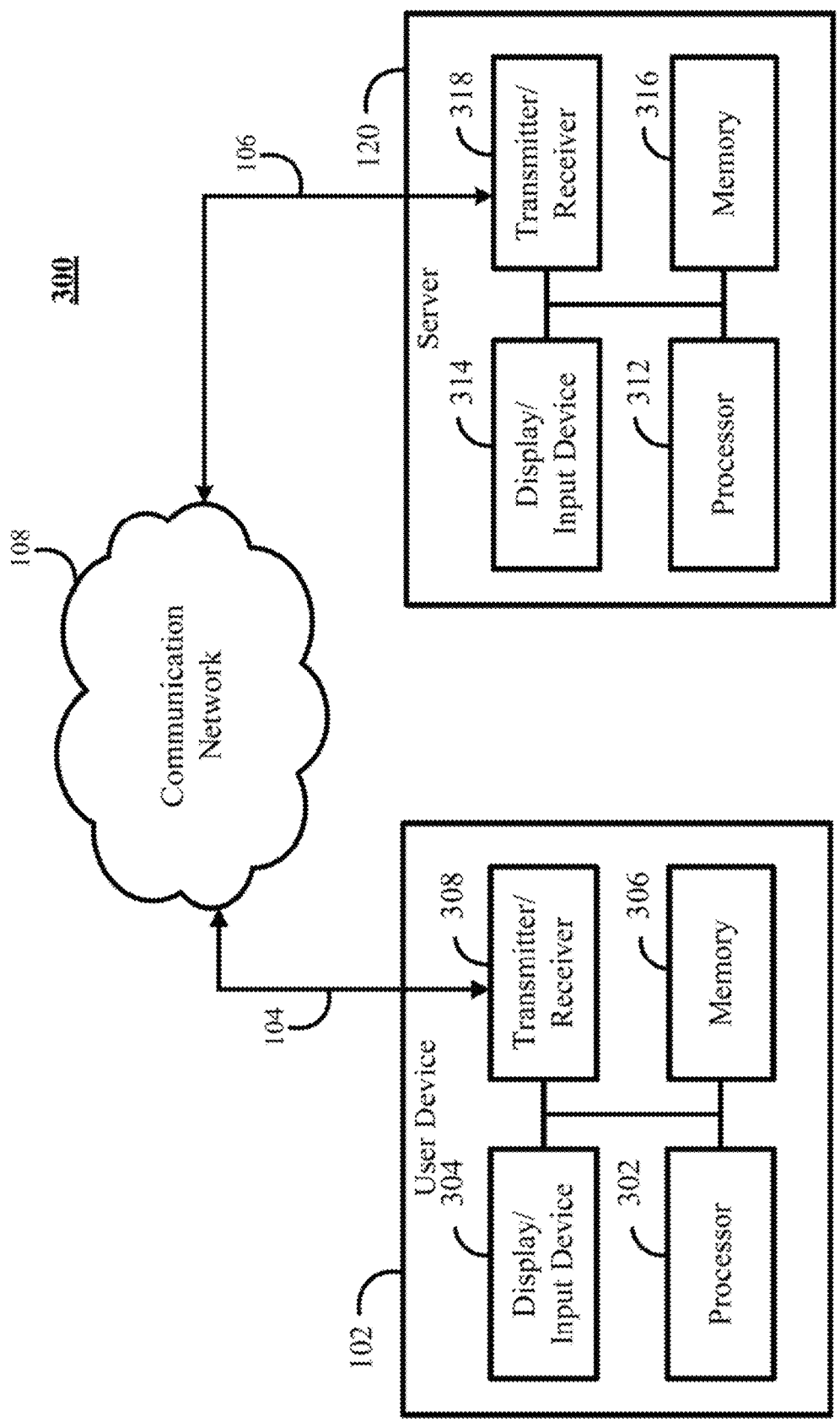
FIG. 3 shows a detailed example of hardware that can be used to implement one or more of the user devices and servers depicted in FIG. 1 in accordance with some implementations of the disclosed subject matter.

FIG. 3 shows an example 300 of hardware that can be used to implement one or more of user devices 102 and servers 120 depicted in FIG. 1 in accordance with some implementations of the disclosed subject matter. Referring to FIG. 3, user device 102 can include a hardware processor 302, a display/input device 304, memory 306, and a transmitter/receiver 308, which can be interconnected. In some implementations, memory 306 can include a storage device (such as a computer-readable medium) for storing a user device program for controlling hardware processor 302.

Hardware processor 302 can use the user device program to execute and/or interact with the mechanisms described herein for personalizing services based on mood and/or behavior using multiple data sources, which can include presenting one or more recommendation interfaces (e.g., for inputting objective or goal information, for providing authorization to access data from one or more data sources, for selecting data sources, etc.), and can include executing a recommended action. In some implementations, hardware processor 302 can transmit and receive data through communications link 104 or any other communication links using, for example, a transmitter, a receiver, a transmitter/receiver, a transceiver, and/or any other suitable communication device, such as transmitter/receiver 308. Display/input device 304 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 308 can include any suitable transmitter and/or receiver for transmitting and/or receiving, among other things, instructions for presenting content, information related to a current control level, requests for location information, etc., and can include any suitable hardware, firmware and/or software for interfacing with one or more communication networks, such as network 106 shown in FIG. 1. For example, transmitter/receiver 308 can include: network interface card circuitry, wireless communication circuitry, and/or any other suitable type of communication network circuitry; one or more antennas; and/or any other suitable hardware, firmware and/or software for transmitting and/or receiving signals.

Server 120 can include a hardware processor 312, a display/input device 314, memory 316 and a transmitter/receiver 318, which can be interconnected. In some implementations, memory 316 can include a storage device (such as a computer-readable medium) for storing a recommendation program for controlling hardware processor 312.

Hardware processor 312 can use the recommendation program to execute and/or interact with the mechanisms described herein for: obtaining information associated with an objective of a user of a computing device from a plurality of data sources; identifying an objective for a user of a user device; receiving information associated with the user from multiple data sources; determining that a portion of information from each of the multiple data sources is relevant to the user having the identified objective; assigning the user into a group of users from a plurality of groups based on the identified objective and the portion of information from each of the multiple data sources; determining a target profile associated with the user based on the identified objective and the assigned group; generating a current profile for the user based on the portion of information from each of the multiple data sources; comparing the current profile with the target profile to determine a recommended action, where the recommended action is determined to have a likelihood of impacting the emotional state of the user; causing the recommended action to be executed (e.g., on a device possessed by, or located proximate to, the user); determining one or more devices connected to the computing device, wherein each of the one or more devices has one or more device capabilities; and/or transmitting and receiving data through communications link 108. In some implementations, the recommendation program can cause hardware processor 312 to, for example, execute at least a portion of process 400 as described below in connection with FIG. 4. In some implementations, hardware processor 312 can transmit and receive data through communications link 114 or any other communication links using, for example, a transmitter, a receiver, a transmitter/receiver, a transceiver, and/or any other suitable communication device such as transmitter/receiver 318. Display/input device 314 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 318 can include any suitable transmitter and/or receiver for transmitting and/or receiving, among other things, content to be presented, requests for status information of display device 110, requests for content, requests for location information, etc., and can include any suitable hardware, firmware and/or software for interfacing with one or more communication networks, such as network 106 shown in FIG. 1. For example, transmitter/receiver 318 can include: network interface card circuitry, wireless communication circuitry, and/or any other suitable type of communication network circuitry; one or more antennas; and/or any other suitable hardware, firmware and/or software for transmitting and/or receiving signals.

In some implementations, server 120 can be implemented in one server or can be distributed as any suitable number of servers. For example, multiple servers 120 can be implemented in various locations to increase reliability and/or increase the speed at which the server can communicate with user devices 102 and/or data sources 110. Additionally or alternatively, as described above in connection with FIG. 1, multiple servers 120 can be implemented to perform different tasks associated with the mechanisms described herein.

Figure 4:
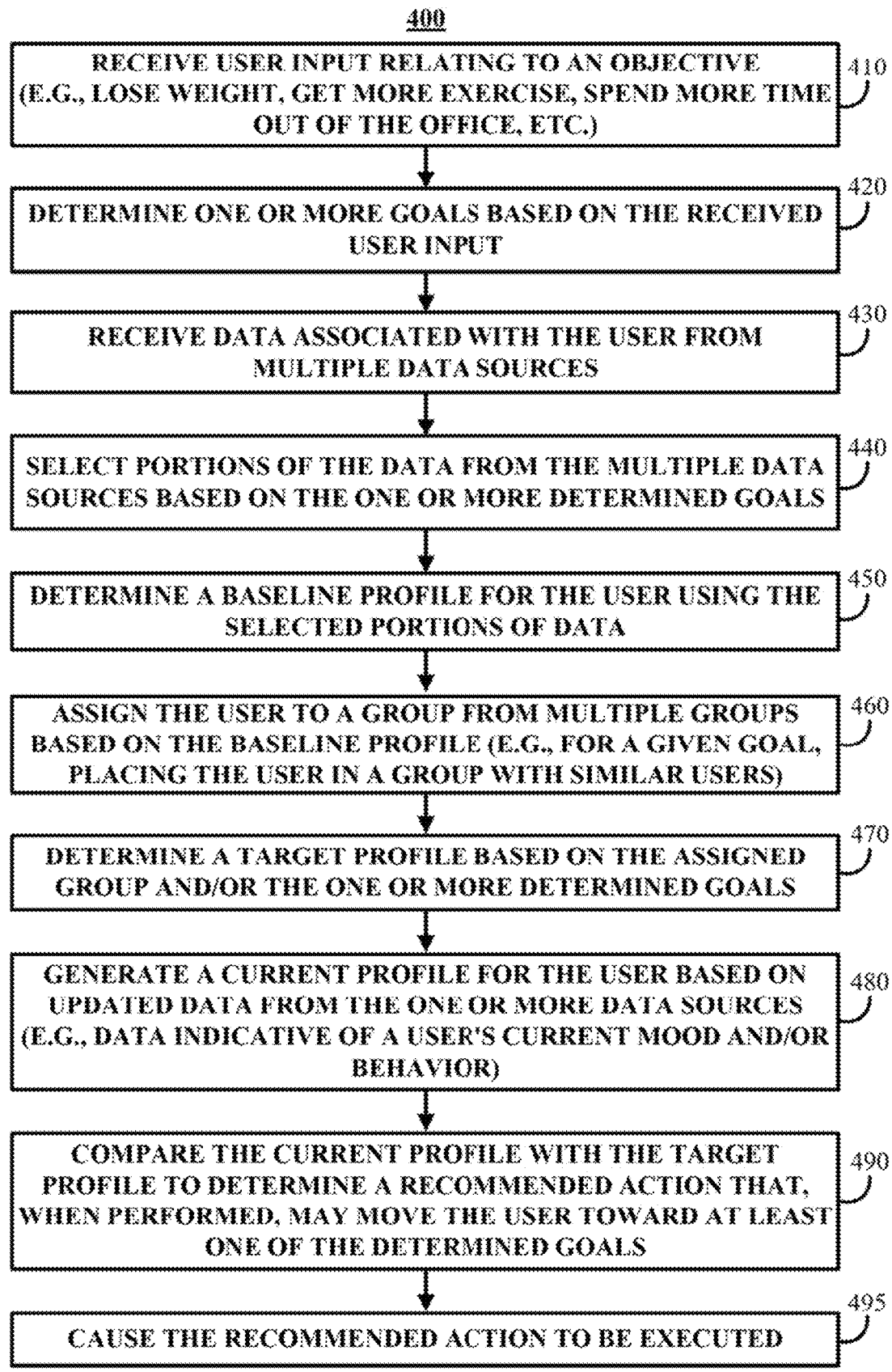
FIG. 4 shows an illustrative example of a process for personalizing computerized services based on mood and/or behavior information from multiple data sources in accordance with some implementations of the disclosed subject matter.

Turning to FIG. 4, an illustrative example 400 of a process for personalizing computerized services based on the physical or emotional state of a user of a user device using data from multiple data sources in accordance with some implementations of the disclosed subject matter is shown.

It should be noted that process 400 can personalize computerized services, where data from multiple data sources can be used to determine the impact of a computerized service on a physical or emotional state of a user having a user device. The emotional state of a user can be a complex phenomenon. Emotion can be a mental state that is associated with physiological activity and can be influenced by internal or external environmental conditions. Emotion can be associated with personality, mood, temperament, disposition, and motivation of a user. For example, emotional states can include happiness, contentment, tranquility, surprise, anger, fear, sadness, depression, disgust, tired, anxious, hurried, etc. In some examples, emotional states can be broadly classified into positive and negative emotions, where positive emotions can include happiness and contentment and negative emotions can include anger and depression. In addition, an example of an internal environmental condition includes an old memory and an example of external stimulus includes stress or the relief of stress due to various environmental factors.

It should also be noted that the physical or emotional state of a user can be considered an overall snapshot or view of the user's physical characteristics or emotions at a point in time. Because multiple factors can be involved in a user's physical or emotional state, the physical or emotional state can fluctuate even over short periods of time. By using data relating to the user from multiple sources, a user's physical or emotional state can be predicted, which can be used to determine whether to recommend a particular computerized action at a given time. Moreover, changes to a user's physical or emotional state can be predicted based on new or updated data relating to the user from multiple sources. Even further, changes to a user's physical or emotional state can be used to evaluate whether recommended computerized actions to devices possessed by, or located proximate to, the user may be moving the user towards a particular goal or objective.

As illustrated, process 400 can begin by receiving user input relating to a particular objective or goal at 410. Illustrative examples of a particular objective or goal can be getting more exercise (e.g., generally increasing the current activity level, getting any form of exercise for at least one hour per day, etc.), losing weight (e.g., generally losing weight, losing ten pounds in three months, etc.), making more friends, accomplishing a particular emotional state (e.g., feel more productive, feel less stressed, etc.), etc.

In a more particular example, in response to receiving authorization from a user of a user device to access social data relating to the user from a social networking service, process 400 can extract keywords from social media posts published by the user on the social networking service to determine one or more objectives of the user. In this example, social data relating to the user from a social networking service can be received, which can include messages or posts having text, image content, video content, and/or audio content, messages posted by other users that are connected to the user, and contextual information, such as timing information, location information, and a declared mood or emotional state of the user or users connected to the user.

Figure 5:
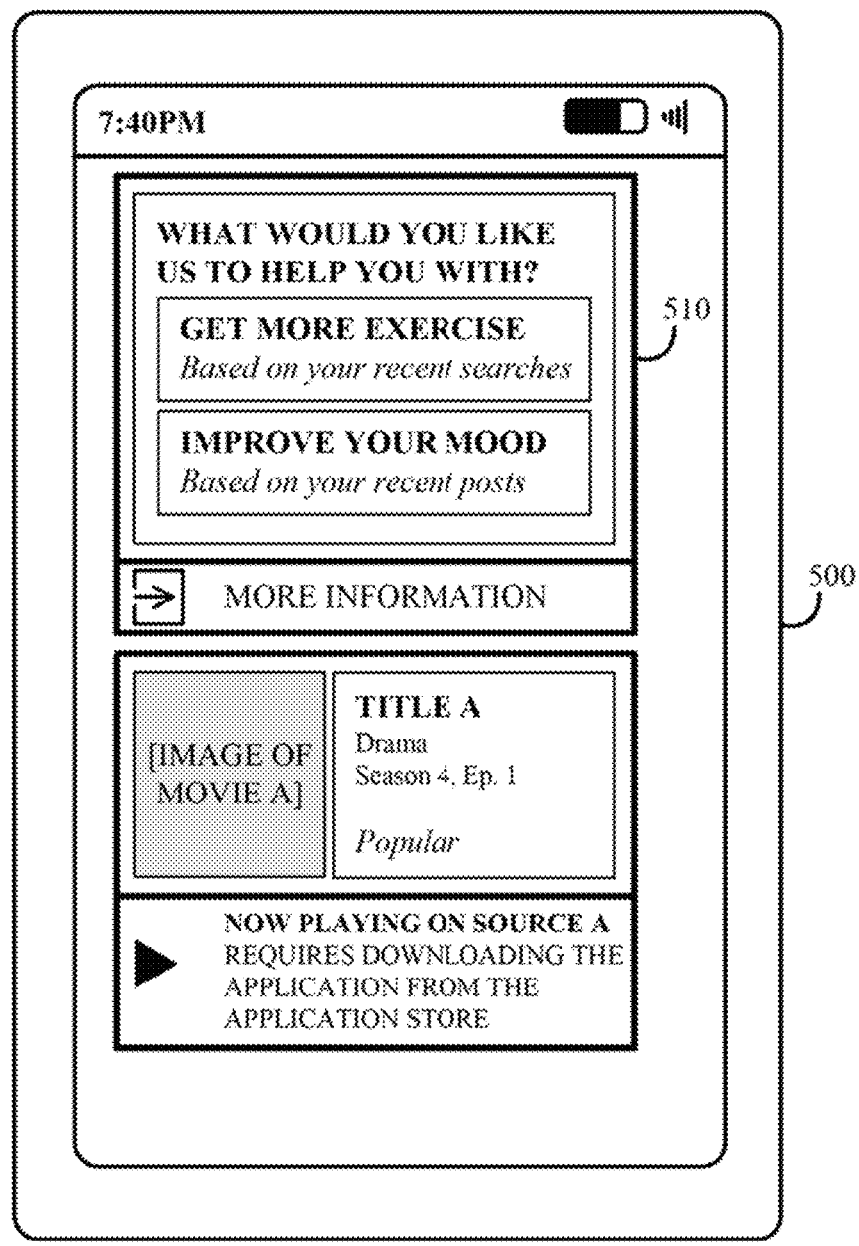
FIG. 5 shows an illustrative example of a user interface for prompting the user of the user device to provide an objective in accordance with some implementations of the disclosed subject matter.

In another more particular example, in response to installing a recommendation application on a computing device associated with the user, the recommendation application can present a recommendation interface on the computing device that prompts the user to select an objective from the user interface. For example, the recommendation interface can be presented as a recommendation card, a notification, or any other suitable user interface that prompts the user to indicate an objective or goal. An illustrative example of a recommendation interface that can be presented on a computing device is shown in FIG. 5. As shown, in some implementations, a user device 102, such as a mobile device 500, can prompt the user to input an objective in recommendation interface 510, such as "get more exercise" or "improve your mood." The suggested objectives in recommendation interface 510 can be presented based on any suitable criterion (e.g., default objectives, popular objectives, objectives selected based on recent searches inputted into the user device, objectives selected based on location information associated with the user device, objectives based on attributes inferred from data sources authorized by the user of the user device, etc.). As also shown, a reason for the suggested objective can be provided, such as "Based on your recent searches" and "Based on your recent posts." Additionally or alternatively, the recommendation interface can present the user of mobile device 500 with a search field to provide keywords relating to an objective or goal that the user desires to achieve.

Referring back to FIG. 4, at 420, the recommendation system can determine one or more goals for a user of a user device based on the determined objective. For example, in response to determining that the objective is to lose weight, the recommendation system can determine goals that are associated with the objective of losing weight—e.g., achieving a first activity level for the first week and a second activity level for the second week, achieving an average activity level over the first month, waking up at a particular time every morning, achieving a threshold amount of rest at the end of each day, eating at particular times on weekdays, etc. As described hereinbelow, the recommendation system can generate various profiles, such as profiles of similar users that each have user devices, profiles of users having user devices who have indicated that they have achieved the determined objective or one of the goals, profiles of users having user devices who have indicated that they have failed to achieve the determined objective or one of the goals, etc. In this example, the recommendation system can process these profiles to determine goals associated with an objective (e.g., which goals were achieved by users that are deemed to be similar to the user, which goals were achieved within a particular amount of time, etc.). In a more particular example, in response to selecting one of the objectives presented in recommendation interface 510, the recommendation system can determine multiple goals associated with the selected objective and select a portion of those goals based on profile information.

In some implementations, the recommendation system can receive any suitable data associated with the user from multiple data sources at 430. For example, from one or more data sources, the recommendation system can receive and/or request data relating to activities engaged in by one or more users of user devices, such as took a walk and the distance traversed using a mobile device with location services, visited a location that corresponds with a coffee shop using a mobile device with social services, attended a social event (e.g., a conference, a party, a sporting event, etc.) using a mobile device with an online calendar, attended a fitness training session using a mobile device with an online calendar and/or social services, etc. As another example, from one or more data sources, the recommendation system can receive and/or request data that includes timing information related to an activity, such as a duration of the activity, a time corresponding to the activity, etc. As yet another example, the recommendation system can receive and/or request data that includes a number of occurrences of an activity engaged in by one or more users during a given time period (e.g., a day of the week, a couple of days, weekdays, weekends, etc.), a number of users that engage in a given activity, and/or any other suitable information relating to frequency information related to a given activity.

In some implementations, the recommendation system can receive and/or request data relating to content and/or information published by the user on a social networking service. For example, the data can include one or more mood states published by a user on a service (e.g., a social networking service, a messaging service, a video sharing service, a photo sharing service, an electronic commerce service, etc.). As another example, the data can include comments, messages, posts, locations, and/or any other suitable content published by the user on a social networking service. As still another example, the data can include any suitable information relating to one or more social connections of the user on a social networking service, content posted by the social connections, locations associated with the social connections, etc.

In some implementations, the recommendation system can receive and/or request data relating to user interactions with one or more media content items. For example, the data can include any suitable information relating to a media content item with which the user has interacted. In a more particular example, the data can include a type of the media content item, a description of the media content item, a link to the media content item (e.g., a URL), an identifier that can identify the media content item (e.g., a URI, a program identifier, etc.), an author of the media content item, an artist related to the media content item, etc. As another example, the data can include any suitable information about a type of a user interaction with a media content item on a user device, such as consuming the media content item, publishing the media content item via a social networking service or any other suitable service, sharing the media content item with other users, liking the media content item via a social networking service or any other suitable service, commenting on the media content item, etc. As yet another example, the data can include any suitable timing information related to a user interaction with a media content item on a user device, such as a duration of the user interaction, a time corresponding to the user interaction, etc.

In some implementations, the recommendation system can receive and/or request biometric data associated with the user of a user device. For example, in response to receiving authorization to access biometric data from a data source that includes a sensor, the biometric data can include any suitable physiological parameter associated with the user, such as a heart rate, a respiration rate, a blood pressure, a body temperature, skin moisture, etc. As another example, the biometric data can include a range of physiological parameters, such as a heart rate range, a blood pressure range, etc.

In some implementations, the recommendation system can receive and/or request location data associated with the user of a user device. For example, in response to receiving authorization to access location information, the location data can include any suitable information that can be used to estimate a location of a computing device associated with the user, such as an identifier associated with the computing device (e.g., an IP address, a device identifier, a media address control (MAC) address, a serial number, a product identifier, etc.), GPS signals generated by the computing device, Wi-Fi access points associated with the computing device, information about a cell tower to which the computing device is connected, etc. As another example, the location data can include any suitable information that can be used to estimate a location of the user, such as a location published by the user using a suitable service (e.g., a social networking service), a location that a user intends to visit (e.g., a location associated with a social event scheduled using a calendar application executing on a mobile device, a social network account associated with the user, etc.), etc.

Figure 6:
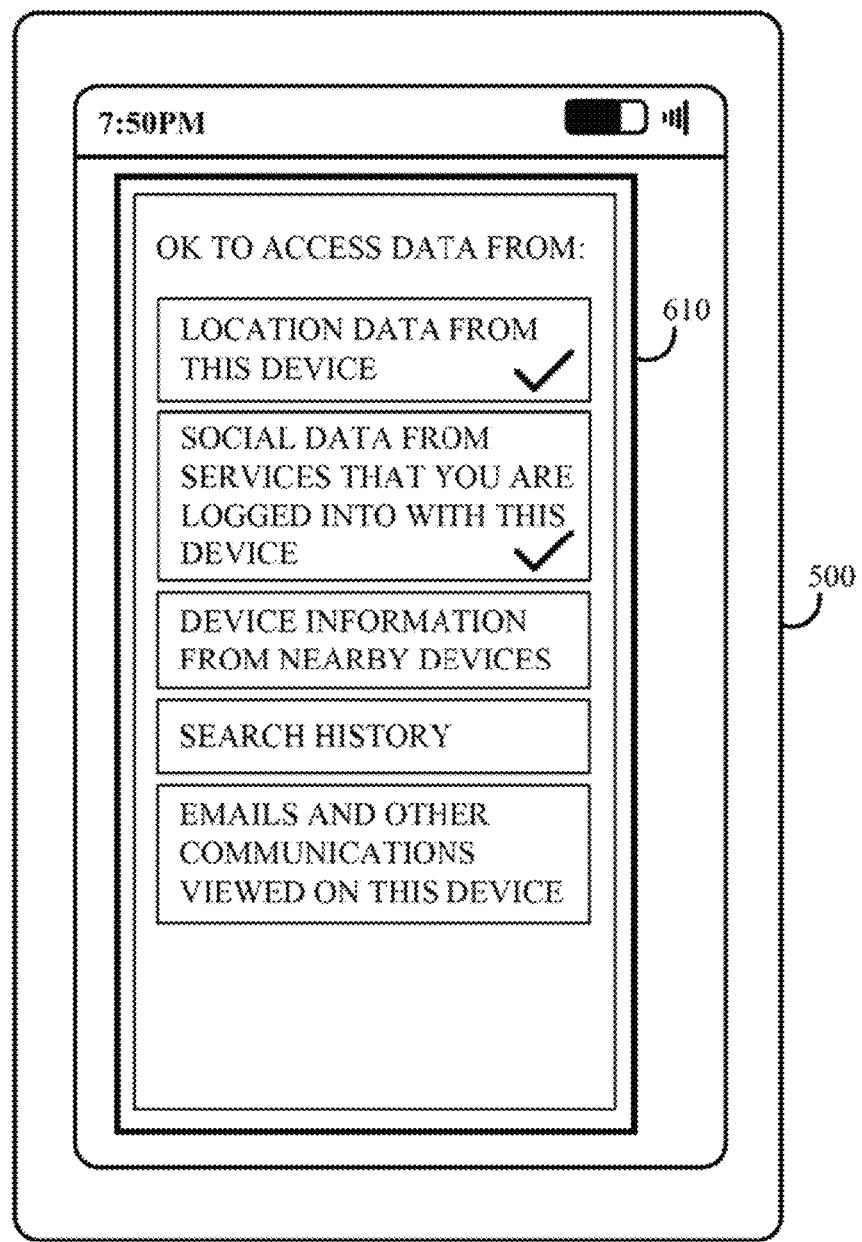
FIG. 6 shows an illustrative example of a user interface for prompting the user of the user device to select one or more data sources for retrieving data relating to the user in accordance with some implementations of the disclosed subject matter.

In some implementations, the recommendation system can present a recommendation interface, such as the recommendation interface shown in FIG. 6, where the user of mobile device 500 is prompted with data sources for selection. For example, various data sources can be detected by the recommendation system executing on mobile device 500 and, in response to detecting the various data sources, the user can be prompted to select which data sources to obtain data associated with the user. As shown in FIG. 6, a recommendation interface prompts the user of mobile device 500 to select from various data sources that are available to the recommendation application, where the user has indicated a permission to access location data from mobile device 500 and social data from services that have been authenticated using mobile device 500. In a more particular example, the recommendation system can prompt the user to provide authorization to access particular data sources and select which data sources may include data that is relevant towards accomplishing a goal or objective. In this example, the recommendation system can provide an interface prompting the user of the user of the user device to provide credentials, such as a username and password, for accessing a particular data source.

In some implementations, the recommendation system can prompt the user to provide additional information in response to selecting one or more data sources for obtaining user, such as using recommendation interface 610. For example, the recommendation system can determine that, in order to generate a baseline profile for the user, certain portions of the baseline profile can be derived or satisfied using data obtained from the selected data sources and other portions of the baseline profile remain incomplete. In response, the recommendation system can generate an interface that prompts the user to provide such information—e.g., if the goal is "losing weight," such an interface can prompt the user of mobile device 500 to input a height value and a weight value.

Referring back to FIG. 4, the recommendation system can select portions of the data received from multiple data sources based on the objectives or determined goals at 440. For example, the recommendation system can receive data from multiple data sources (e.g., using one or more application programming interfaces) and can determine that the received data is to be classified into various categories of data. These categories can include, for example, general data, contextual data, social data, and personal data. Examples of general data can include information about one or more services used by a user (e.g., a social networking service, an email service, a messaging service, a video sharing service, etc.), search history associated with a user (e.g., keywords inputted by the user), etc. Examples of contextual data can include information about a location of user device 102, traffic information, weather information based on location information from user device 102 (e.g., "sunny," "cold," etc.), population density information within a given location, a location context relating to data provided by a data source 110 (e.g., "work," "home," "vacation," etc.), information relating to devices located near or connected to a user device, and/or any other suitable information that can provide contextual information related to the user. Examples of social data can include information related to social events involving multiple users (e.g., a conference scheduled using a social networking service, a calendar application, etc.), content and/or information published by one or more users using a service (e.g., a social networking service, a video sharing service, a photo sharing service, etc.), information about one or more social connections of a user, and/or any other suitable information that can be classified as social data. Examples of personal data can include personal interests of a user (e.g., a user's stated interest available on a social networking service, media content consumed and/or liked by a user, etc.), one or more utterances generated by a user, and/or any other suitable information that can be regarded as personal.

Figure 7:
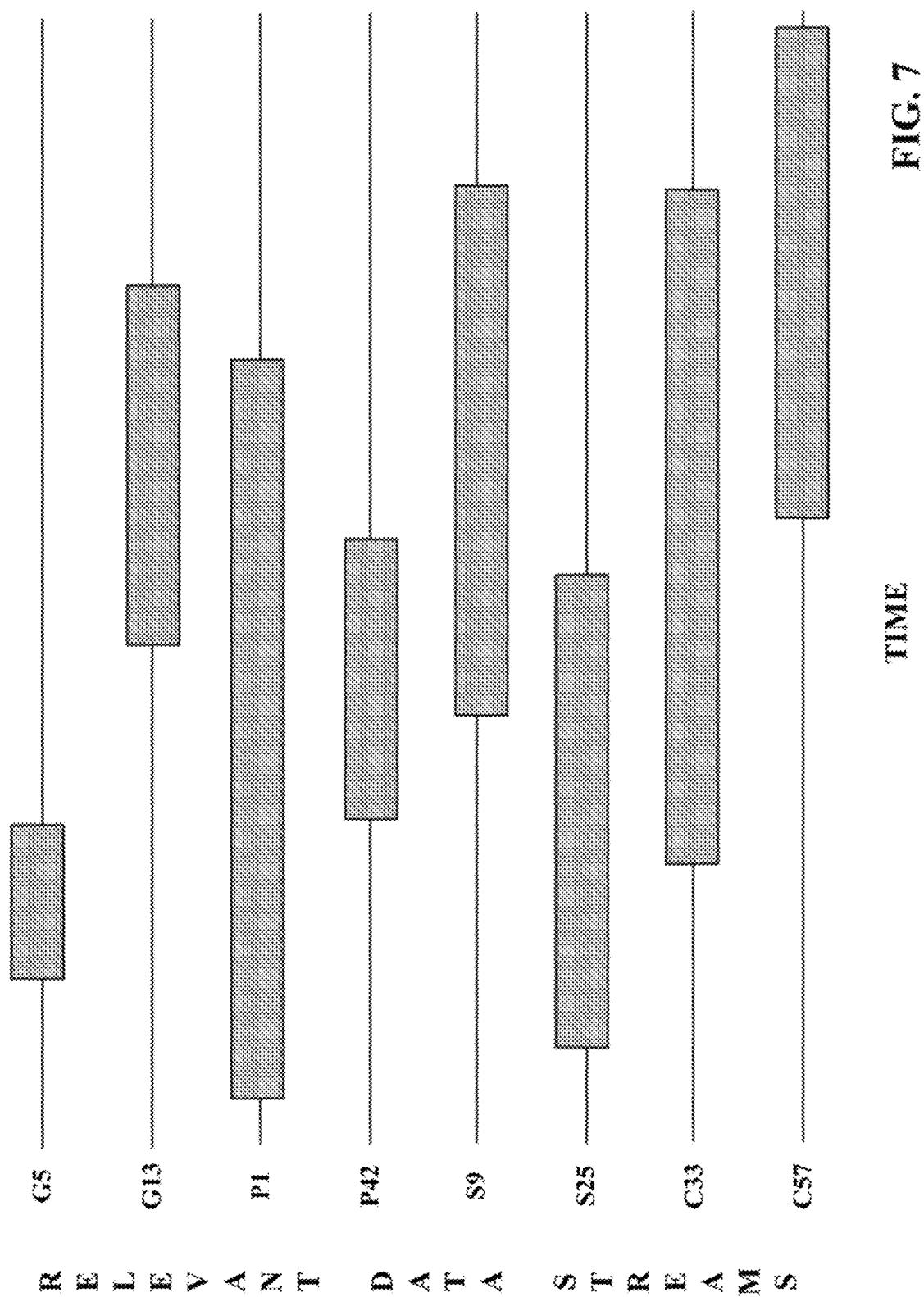
FIG. 7 shows an illustrative example of a portion of data at various times selected from the data that is received from multiple data sources based on a particular objective or goal in accordance with some implementations of the disclosed subject matter.
Figure 8:
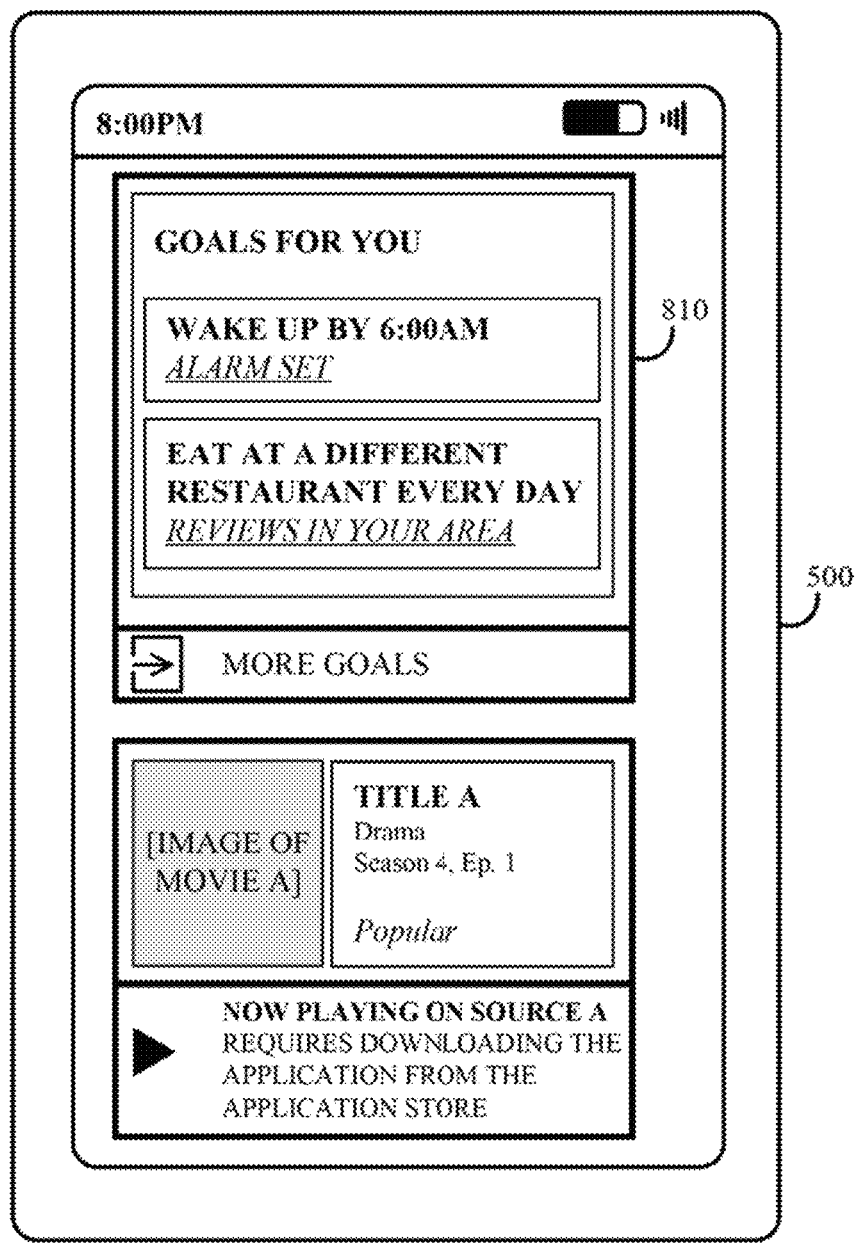
FIG. 8 shows an illustrative example of a user interface for presenting the user with selectable goals corresponding to an objective in accordance with some implementations of the disclosed subject matter.

In some implementations, the recommendation system can create a data stream for each category of data. For example, in response to categorizing particular data from multiple services as being social data, the recommendation system can aggregate the social data as it is being received and create a social data stream that includes timestamped social data from the multiple sources. Alternatively, upon receiving authorization from the user to access a particular data source, the recommendation system can categorize the data received from that source and place the data into a data stream that is associated with that data source, such as a social data stream of timestamped social data from a particular social source. For example, as shown in FIG. 7, multiple data streams from multiple data sources can be obtained—e.g., general data (G5 and G13), personal data (P1 and P42), social data (S9 and S25), and contextual data (C33 and C57).

In some implementations, the recommendation system can select particular portions of data by determining which categories of data to analyze and which portions of the data are to be used to determine a recommendation action that may, for example, affect the physical or emotional state of the user. In response to determining an objective at 410 or a goal at 420 for the user of the user device, the recommendation system can select particular categories of data that may include data that is relevant to the objective or goal. For example, the recommendation system can determine that social data and contextual data are likely to be relevant to the objective of losing weight. In response to analyzing the data relating to the user from multiple data sources at 430, the recommendation system can select particular categories of data from particular data sources and select particular time portions of data that are indicative or representative of the physical or emotional state of the user. For example, the recommendation system can, in response to receiving authorization from a user of a user device to receive data relating to the user from multiple data sources, determine that, during weekdays between 9 AM and 5 PM, the user device is not typically used on social data sources and that contextual data from the user device and devices connected to the user device are likely to be representative of the emotional state of the user. It should be noted that, using the received data and/or the determined objectives and goals, the recommendation system can select different subsets of data for making different determinations—e.g., a subset of data for recommending a particular action, a subset of data that is indicative of the emotional state of the user during a particular time of the day, a subset of data that is indicative of the emotional state of the user during an average day, a subset of data that is representative of the activities of the user on a given day, etc.

In some implementations, each objective or goal can have an associated data template for retrieving data that is related to the user and that is relevant to the objective or goal. For example, in response to determining an objective at 410 or a goal at 420, the recommendation system can retrieve an associated data template that includes particular data fields, such as particular social-related data fields (e.g., keywords extracted from social posts and an associated time), contextual-related data fields (e.g., location information from multiple devices associated with the user corresponding to the times of each social post), and general data fields (e.g., type of applications that the user device has installed and device profiles of devices that are nearby the user device). As described above, in response to determining that information for particular data fields may not be completed or derived using data from the data sources, the recommendation system can prompt the user to input such missing data (e.g., by generating a user interface prompt the user to input data and/or input the accuracy of inferences made about the user).

It should be noted that, although the recommendation system can make a determination based on particular subsets of data and can retrieve data templates that request particular portions of data, the user of a user device, such as user device 102, can be provided with controls for setting which data sources are used (e.g., a specific social networking service, a specific mobile device, etc.) and which types of data are used by the recommendation system (e.g., social information from a specific social networking service and not data determined to include personal information, social post information from a social networking service and not relationship information from a social messaging service, etc.). For example, the user can be provided with an opportunity to select a particular type of data from a particular data source that may include data relevant to the user for a particular goal or objective.

In some implementations, using the selected portions of data from the multiple data sources, the recommendation system can determine a baseline profile for the user at 450. For example, the recommendation system can process the selected portions of data and generate one or more baseline profiles associated with each objective or goal. In a more particular example, a baseline user profile associated with a goal can include any suitable information relating to the physical or emotional state of the user (e.g., "happy," "unhappy," etc.) and information about one or more user behaviors or habits (e.g., commuting, lunch break, weekly meetings, exercise groups, etc.). In another more particular example, a baseline user profile can use heart rate information, temperature information, galvanic skin response information, location information, and social post information, match such information with an emotional state, and establish baseline patterns for emotional state through a given time period, a day, a week, a season, etc.

In some implementations, using the selected portions of data from the multiple data sources, the recommendation system can determine an overall baseline profile for the user that includes multiple sub-profiles—e.g., a sub-profile that uses the data to predict the current emotional state of the user, a sub-profile that describes the typical activity level of the user, a sub-profile that describes typical behaviors of the user at particular times of the day, etc. Any suitable number of sub-profiles can be generated to create an overall baseline profile of the user. It should also be noted that, in some implementations, the recommendation system can use different subsets of data for each of the sub-profiles that form the overall baseline profile of the user.

In some implementations, the recommendation system can assign the user to a group of users based on the baseline profile at 450. For example, the recommendation system can identify a group of users that have accomplished the goal or objective and one or more behaviors associated with users in the group and/or actions performed by users in the group. In another example, the recommendation system can identify a group of users that have failed to accomplish the goal or objective and one or more user behaviors associated with users in the group and/or actions performed by users in the group. The recommendation system can then correlate particular behaviors and/or actions with the goal for the user.

In some implementations, the recommendation system can use machine learning techniques to identify and cluster similar user profiles. For example, the recommendation system can use machine learning techniques to determine which group profile is most similar to the baseline profile associated with the user and, in response, can place the user into the group associated with that group profile. In another example, the recommendation system can use machine learning techniques to determine which group profile includes users having user devices that are similar to the user of the user device and includes users interested in attaining the same objective. In yet another example, the recommendation system can use machine learning techniques to determine which group profile has sub-profiles that include common features to the sub-profiles that form the overall baseline profile of the user. It should be noted that any suitable machine learning technique can be used, such as a support vector machine, a decision tree, a Bayesian model, etc.

It should be noted that, in some implementations, other information can be used to group similar users together. For example, the group of users can include users having user devices that are in a similar geographic proximity, such as users that are in the same city as a particular user. As another example, the group of users can include users that are connected to each other on one or more social networking services.

It should also be noted that, in some implementations, process 400 can return to 420, where the recommendation system can determine one or more goals for achieving a particular objective based on the assigned group of users. For example, for a particular objective, the recommendation system can retrieve one or more goals that are associated with an assigned group of similar users that have indicated a desire to reach the objective. In another example, for a particular objective, the recommendation system can rank the goals associated with an objective, where the ranking is based on inputs from users in the group of users as to which goals assisted the user in reaching the objective. The recommendation system can then select at least a portion of the goals for the user that may assist the user in reaching the objective. The selected goals can then be presented to the user in a recommendation interface, such as recommendation interface 800 shown in FIG. 8. In this example, the recommendation system can provide the user of mobile device 500 with an opportunity to remove and/or add additional goals.

In some implementations, the recommendation system can use the baseline profile generated at 450 for other determinations. For example, the recommendation system can determine whether a current profile that includes updated data relating to the user from multiple data sources deviates from the previously generated baseline profile. Deviations between the baseline profile and the current profile can include, for example, a comparison of the frequency of particular activities (e.g., exercise frequency) and a comparison of the timing information relating to particular behaviors (e.g., the time when the user wakes up each day). Such a deviation can indicate that the data or such determinations based on the data may not be indicative of the emotional state of the user (e.g., a stress response may be detected from the user in response to a job change). Such a deviation can also indicate that the recommendation system is to update the baseline profile and/or update the assignment of the user into another group of users (e.g., as the user is progressing towards a goal or objective, as the behaviors of the user have changed over time, etc.). In another example, such a deviation can indicate that the recommendation system is to recommend actions that may return the user back to the baseline profile.

In a more particular example, the baseline profile generated by the recommendation system can include behaviors and/or activities associated with the user (e.g., consuming classical music, attending a fitness session, etc.), timing information relating to each of the behaviors and/or activities (e.g., time spent listening to classical music), frequency of a particular behavior and/or activity over a given time period (e.g., the number of times the user using the user device has listened to classical music during the week), threshold values associated with behaviors and/or activities (e.g., the user tends to listen to classical music at least three times a week for at least thirty minutes each session), etc.

In another more particular example, the baseline profile generated by the recommendation system can include any suitable representation of data related to the user. For example, in response to receiving a particular portion of biometric data, the recommendation system can determine an average heart rate for the user while at the office, an average number of calories burned on weekdays, and an activity curve for an average day for the user.

It should also be noted that multiple baseline profiles can be generated and associated with the user of the user device. For example, the recommendation system can generate a baseline profile using a first subset of data that is associated with a goal (e.g., getting at least thirty minutes of exercise per day) and another baseline profile using a second subset of data that is associated with another goal (e.g., using an email application for less than a particular amount of time). In another example, the recommendation system can generate a baseline profile in a particular context, such as "work," and another baseline profile in another context, such as "vacation."

In some implementations, the recommendation system can generate a target profile based on the assigned group, the goals, and/or the objective at 470. For example, for a particular objective, the recommendation system can identify and cluster user profiles of users where it has been determined that the user has met a goal or an objective. In another example, the recommendation system can identify and cluster user profiles of users where it has been determined that the user has not met a goal or an objective (e.g., to determine which actions may not be assisting users in meeting a particular goal or objective). In yet another example, the recommendation system can identify and cluster user profiles of users that the recommendation system has previously assisted the users in attaining a stated goal or objective.

In a more particular example, the recommendation system can generate a target profile for achieving a particular goal or objective using a profile that includes information relating to users that have met the particular goal or objective and information relating to users that have not met the particular goal or objective. In this example, the recommendation system can determine actions, threshold values, and other information that may assist the user in attaining the particular goal or objective—e.g., users that have been determined to achieve the objective of losing ten pounds in a month have also walked at least one mile each day, woken up by 6 AM in the morning, listened to classical music in the evening, and eaten meals at particular times. By, for example, determining common features between users that have indicated an achievement of the particular goal or objective, the recommendation system can generate a target profile that can be used to recommend actions to the user. These actions, if performed, may affect the current profile of the user such that the current profile of the user moves towards the target profile.

Referring back to FIG. 4, in some implementations, the recommendation system can generate a current profile for the user based on updated data from the multiple data sources at 480. It should be noted that the baseline profile and the current profile associated with the user can be dynamic profiles that can be generated using updated data from the multiple data sources. For example, in response to determining that a particular period of time has elapsed (e.g., one minute, one day, etc.), the recommendation system can receive and/or request updated data from the multiple data sources and generate a current profile for the user. Alternatively, the recommendation system can continue to use the baseline profile.

In some implementations, the recommendation system can compare the current profile with the target profile to determine a recommended action at 490. This may, for example, impact the physical or emotional state of the user. Based on the objective or goal and the profile information, the recommendation system can determine which computerized action is to be executed at the user device, a device that the user possesses, or a device that is proximate to the user device.

In some implementations, the recommendation system can determine multiple computerized actions that are recommended to the user of the user device at various times. For example, the recommendation system can determine that a user has the particular objective of getting more exercise during the course of the user's workday. In response to receiving authorization from the user of a user device to access social networking data from a social networking service, location data from a mobile device associated with the user, and calendar data from an online calendar associated with the user, the recommendation system can determine that the user is currently feeling a relatively low energy from the social data and that the user has a meeting that is scheduled at a particular time and that is taking place at a particular location from the calendar data (with no obligations between the current time and the time of the meeting). The recommendation system can use such data and incorporate other data into a dynamic user profile. For example, based on biometric data from a wearable pedometer associated with the user, the recommendation system can determine the amount of activity that the user has engaged in that month to date or week to date and determine whether the user is likely to meet an indicated objective or goal or likely to meet an average activity level. In another example, based on location information, the recommendation system can determine the frequency that the user uses a car service to attend meetings at a particular location that is ten blocks away from a work location associated with the user. In yet another example, based on stated interests and/or affinities on a social networking service, the recommendation system can determine that the user of the user device likes flowers. In a further example, using mapping data, the recommendation system can determine a route between the work location associated with the user and the location of the meeting. Taking into account these portions of data from multiple data sources, the recommendation system can generate a current profile associated with the user and compare it with a target profile that can be associated with the particular objective and/or with a particular group of users. Based on the comparison, the recommendation system can cause one or more recommended actions to be executed, such as a notification that prompts the user to purchase a cup of coffee from a nearby coffee shop in five minutes, a notification that prompts the user to walk to the meeting using a particular route that includes an option to visit an orchid shop that recently opened in a location that is along the provided route. Alternatively, the recommendation system can, a particular time prior to the meeting, cause a scent generator located in proximity of the user device to emit a lavender scent. In another alternative example, the recommendation system, at a particular time prior to the meeting, determine the weather in proximity of the user device prior to causing a notification that prompts the user to walk to the meeting using a particular route as identified by a computer map route service, such as Google Maps (e.g., upon determining that the chance of precipitation is greater than a particular threshold value, upon determining that it is "too hot" for the user based on the determined temperature and user data as to what is considered "too hot," etc.).

Continuing with this example, the recommendation system can determine that the user has visited the orchid shop and/or that the user is walking to the coffee shop as recommended by the recommended action. The recommendation system can then use an application programming interface corresponding to the coffee shop to request the number of consumers in the coffee shop and can determine that the user may have a particular waiting time at the coffee shop. The recommendation system can, using its respective application programming interface, then determine that another coffee shop within the same franchise has a lesser waiting time and is nearby the user of the user device (e.g., a block away from the current location provided by the user device). The recommendation system can transmit an updated or revised recommended action to the user device.

It should be noted that each of these multiple computerized actions can be associated with a corresponding trigger event. For example, an action, such as the notification prompting the user to purchase coffee from a nearby coffee shop, can be triggered based on an associated time (e.g., time of day, time of the preceding event, time until the next scheduled event begins, etc.). In another example, an action, such as the notification prompting the user to visit an orchid shop along the route to a scheduled meeting, can be triggered based on location information associated with the user device (e.g., detecting that the user device is within a particular proximity of the orchid shop). In yet another example, the recommendation system can determine that the action is a message that is to be presented in a particular form (e.g., by email, text message, mobile notification, account notification, and/or in any other suitable manner) and/or at a particular time (e.g., based on the predicted emotional state of the user).

Referring back to FIG. 4, the recommendation system can cause the recommended action or actions to be executed at 495. Illustrative examples of recommended actions are shown in FIG. 2. As shown, the action or output can include, among other things, a haptic or touch sensitive feedback, a sensory feedback (e.g., image content, light cues, music, video messages, video content, etc.), an ambient-related feedback (e.g., causing a scent to be emitted from a suitable device, modifying a lighting scheme by a lighting or home automation system, etc.), and/or a content-related action (e.g., presenting text, image content, video content, audio content). In a more particular example, the recommended action can include modifying a sound, cancelling a sound, or enhancing a sound in the background of the user of the user device using an audio output device that is connected to the user device. In another more particular example, the recommended action can include providing sensory feedback (e.g., light cues, audio cues, video cues, scent cues, etc.) in the environment of the user of the user device to provide a notification. In yet another more particular example, the recommended action can include nostalgia-oriented feedback including content-related actions based on historical information relating to the user. In a further example, the recommended action can include a prioritization of application data based on device information and other information relating to the user (e.g., the organization of user interface elements, the positioning of documents or files, etc.).

In some implementations, the recommendation system can, based on the recommended action, identify one or more devices that may be connected to, or proximate to, the user of user device for executing the recommended action. In some implementations, the recommendation system can initiate device discovery functions to determine which device or devices are near the user device. In some implementations, such device discovery functions can be initiated in response to launching a recommendation application on the user device or in response to determining that a recommended action is to be executed using a device. Additionally or alternatively, in some implementations, such device discovery functions can be initiated from any suitable device and can use any suitable information to determine which devices are near the user device.

In some implementations, the user device can determine whether any output devices are nearby. The user device or the recommendation application executing on the user device can use any suitable technique or combination of techniques to determine whether any output devices are nearby. For example, the user device can transmit a signal or signals including a message requesting that nearby devices (e.g., devices which receive the signal) to respond with a message indicating that the device received the signal. In this example, the response can include any suitable device information, such as device location information and device capability information. As another example, the user device can receive a signal or signals transmitted by a device including a message indicating that the display device is available for causing a recommended action or output to be executed. Such signals can be transmitted using, for example, peer-to-peer communication techniques such as Bluetooth, using RFID techniques, and/or using any other suitable technique or combinations of techniques for communicating between the user device and one or more output devices.

Figure 9:
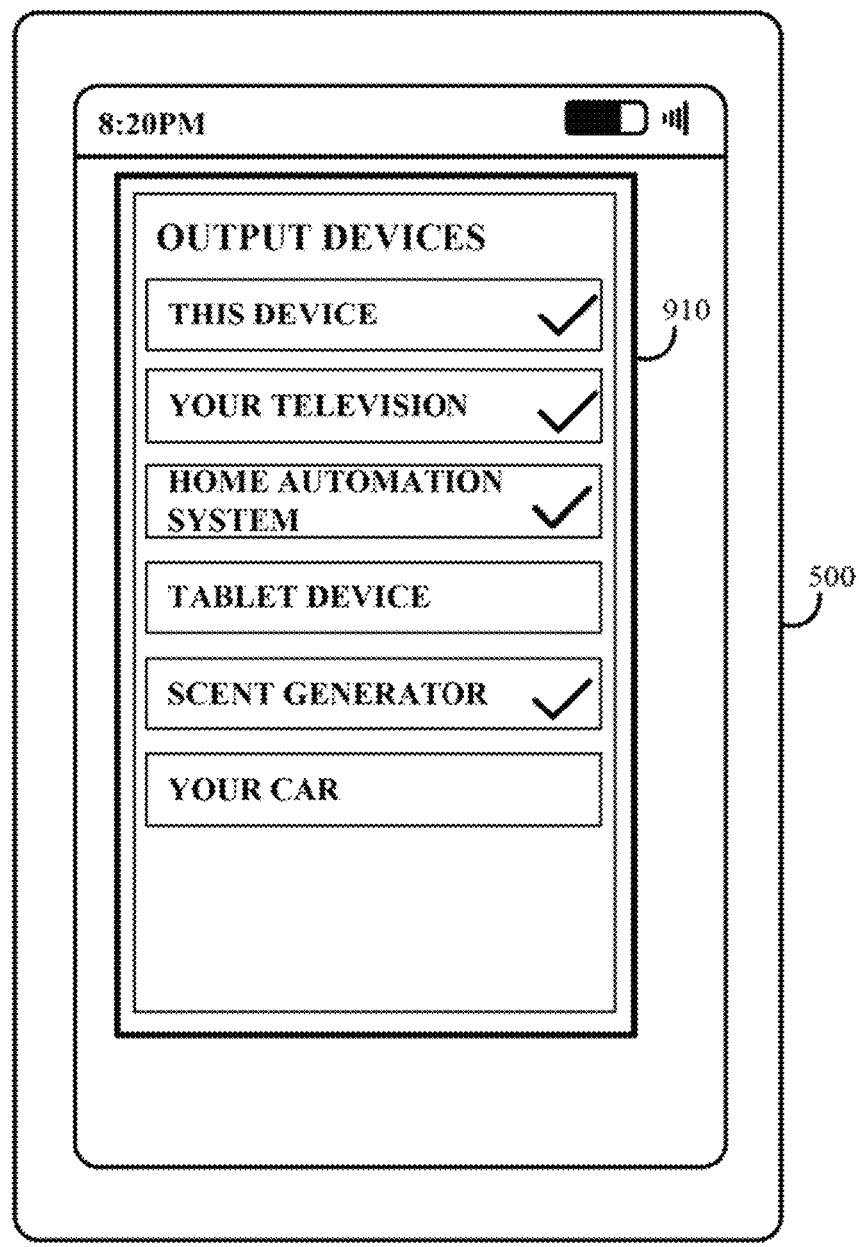
FIG. 9 shows an illustrative example of a user interface for presenting the user with selectable output devices that can be used to execute a recommended action in accordance with some implementations of the disclosed subject matter.

In some implementations, the recommendation system can provide the user with the opportunity to select one or more output devices that are available for executing a recommended action. For example, as shown in FIG. 9, recommendation interface 910 can provide the user with the opportunity to select, add, or remove various output devices that have been detected as being connected to or proximate mobile device 500. As shown, such output devices can include a television device, a home automation system, a tablet computing device, a scent generator, and an automobile. In some implementations, the recommendation interface can provide the user with the opportunity to request that the user device detect additional output devices (e.g., in response to moving to a different location that is in the proximity of other devices).

In some implementations, the recommendation system can cause an output device to execute a particular action based on the physical or emotional state of the user. For example, prior to executing the particular action using the output device, the recommendation system can determine the current emotional state of the user and, upon determining that the emotional state of the user is "angry" based on user data, can inhibit the action from being executed on the output device. In another example, the recommendation system can determine that the particular action can be executed on the output device upon determining that the emotional state of the user is anything except for "angry"— e.g., as the recommendation system has determined from historical user data that actions taken by one or more output devices are not well received when the user is experiencing an "angry" emotional state.

Additionally or alternatively, in some implementations, the recommendation system can cause an output device to execute a particular action based on the predicted impact of the particular action on the current physical or emotional state of the user. For example, prior to executing a particular action using the output device, the recommendation system can determine the predicted impact of the action on the physical or emotional state of the user and, upon determining that the predicted impact is not within a particular range (e.g., the emotional state correlated with the user data remains unchanged), can inhibit the action from being executed on the output device.

Figure 10:
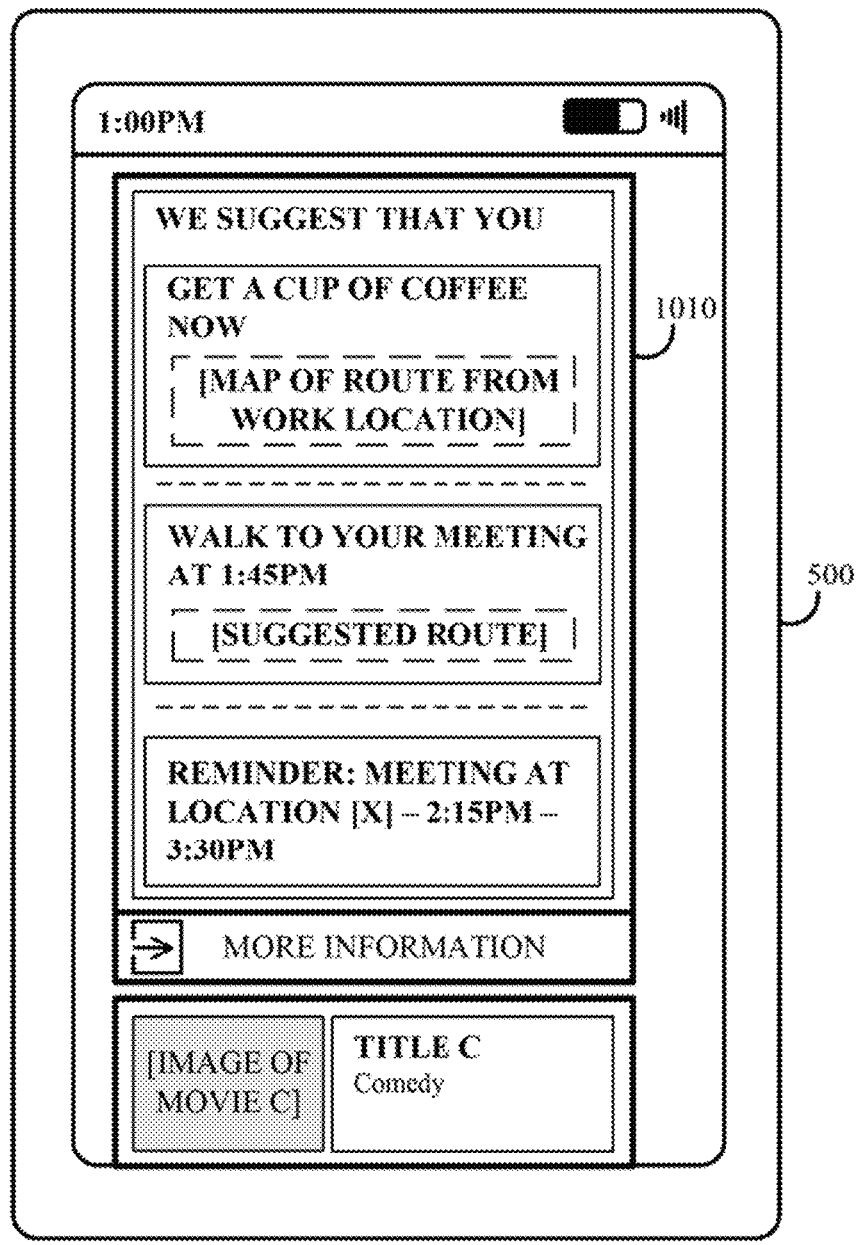
FIG. 10 shows an illustrative example of a user interface for presenting the user with a recommendation interface that includes a recommended action in accordance with some implementations of the disclosed subject matter.

As shown in FIG. 10 and in connection with the above-mentioned example, the recommendation system can present the user with a recommendation interface 1010 that includes multiple recommended actions. As shown, each recommended action that is presented in recommendation interface 1010 can include additional information for performing the recommended action, such as a map of a route in response to recommending that the user walk to the location of an event or commerce information in response to recommended that the user purchase a cup of coffee. As also shown, each recommended action can be associated with a particular time, such as purchasing a cup of coffee now or beginning a walk to the event at 1:45 PM. In some implementations, as described above, each recommended action in recommendation interface 1010 can be triggered by the occurrence of a particular event, such as a determination that the user device is associated with a particular location, a determination that the user device indicates the user is walking along a particular route, etc.

It should be noted that, in some implementations, a recommended action can be executed for multiple users. For example, as described above, the recommendation system can place the user of the user device into a group of users having a similar baseline profile. In addition, the recommendation system can place the user into a group of users based on other suitable criterion, such as others users having an established relationship with the user (e.g., based on social data from a social networking service) or others users that have a similar location profile as the user (e.g., family members, work colleagues, friends, etc.).

In this example, the recommendation system can identify one or more common actions within the group of users. The recommendation system can then select one or more of the actions that are to be executed for the group of users. In a more particular example, the recommendation system can select one or more common actions that are associated with a predetermined number of users (e.g., a majority of the users, a certain percentage of users in the group, etc.) and select one or more common actions that may affect the aggregated emotional state of the group of users. In another more particular example, the recommendation system can rank the common actions based on any suitable criterion and can then select a predetermined number of actions (e.g., top five) and designate them as group actions. In particular, the common actions can be ranked based on a deviation between a current profile associated with the user and a target profile so that the recommendation system can determine which actions have a higher likelihood of affecting the aggregated emotional state of the group of users. For example, a high rank can be assigned to a common action that is associated with a greater deviation between a current profile and a target profile.

For example, the recommendation system can determine an aggregated emotional state for a group of users and can then determine that the group of users or a threshold number of users within the group are located within the proximity of particular output devices. This can include determining that the location information associated with the users in the group of users is within a particular proximity and determining the output devices that are connected to or nearby the user devices associated with each of the co-located users. In a more particular example, the group actions can include any suitable actions that can be executed, such as presenting suitable media content (e.g., a playlist of music that may affect the aggregated emotional state of the group of users), adjusting ambient light in the surroundings of the group of users, adjusting ambient noises and scents in the surroundings of the group of users, etc.

Figure 11:
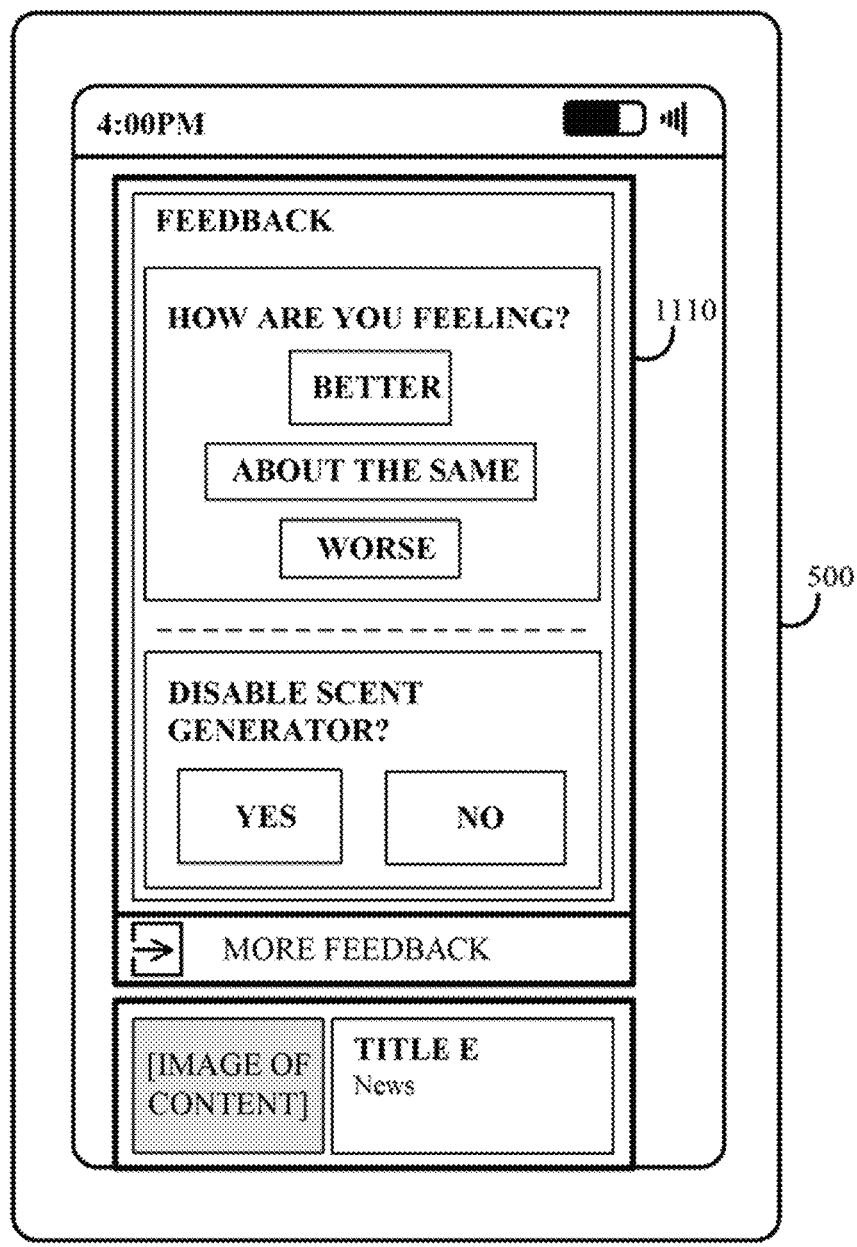
FIG. 11 shows an illustrative example of a user interface that prompts the user to provide feedback relating to an executed action in accordance with some implementations of the disclosed subject matter.

Upon determining that the recommended action has been executed (e.g., the device presented a recommended action that included consuming content or performing a particular activity), the recommendation system can prompt the user of the user device to provide feedback to the recommendation system. For example, the recommendation system can receive feedback from the user indicating whether the recommended action was performed by the user, whether the recommended action may have impacted the emotional state of the user, and/or whether the action is to be recommended again to the user. As shown in FIG. 11, the recommendation system can present an interface 1110 that prompts the user to provide feedback, such as an indication of the change in emotional state, an option to disable an output device, an indication as to whether the user performed a recommended action (e.g., confirming that the user walked to a meeting and visited a coffee shop along the way).

Additionally or alternatively, the recommendation system can obtain updated data, predict the current emotional state of the user and/or generate an updated profile, and determine whether the recommended action or actions may have moved the user towards one or more objectives.

In a more particular implementation, the recommendation system can determine whether a particular recommended action may have moved the user towards one or more objectives and/or goals. For example, the recommendation system can prompt the user to provide feedback (e.g., "How are you feeling now after getting a cup of coffee and watching that video?") in interface 1110 of FIG. 11. In such an example, the recommendation system can receive feedback from the user relating to the particular recommended action. In another example, the recommendation system can select particular portions of data from multiple data streams and determine whether the data indicates that the recommended action may have moved the user towards one or more objectives. In such an example, in response to receiving authorization from a user of a user device to receive data relating to the user from multiple data sources, the recommendation system can select data from times subsequent to providing the recommended action and can determine that the social data and contextual data indicates the recommended action may have moved the user towards one or more objectives (e.g., the data indicates that the user is on track to attain a particular activity level).

In some implementations, any suitable rating can be associated with a recommended action. For example, such a rating can include a confidence value as to how much the recommendation system believes the recommended action may move the user towards one or more objectives. In this example, the recommendation system can begin with an initial confidence value that is incremented or decremented based on feedback from one or more users, where the rating can be increased in response to determining that a particular user has moved towards an objective after providing the recommended action. This increased rating can, for example, cause the recommended action to be provided to other users, such as users having the same or similar objectives, users placed in the same or similar groups as the user, etc. It should be noted that the rating can also include additional information, such as a difficulty value, a timeliness value, etc.

In accordance with some implementations of the disclosed subject matter, the recommendation system can determine that an ambient noise in a room is to be modified, for example, where the modified ambient noise may impact an emotional state, a mood, and/or an experience while performing a particular activity for a user located in the room. For example, in some implementations, the recommendation system can determine that the user is working on their computer (e.g., based on recent activity detected on the user's computer), but is having trouble concentrating and/or is sleepy (e.g., based on a message posted on a social networking web site). In such an example, the recommendation system can cause the ambient noise to fluctuate (e.g., stop and start, change in volume and/or frequency, and/or any other suitable fluctuation) one or more times, which may cause the user to be more alert. As another example, in some implementations, the recommendation system can determine that the user is anxious (e.g., based on information from an activity monitor and/or a sleep monitor that indicates that the user is awake when the user is typically asleep) and can cause the ambient noise or the sounds in the environment of the user to become white noise or approximate white noise. As yet another example, in some implementations, the recommendation system can determine that the user is watching television, and in response, can cause the ambient noise in the proximity of the television device to become softer, which may allow the user to better consume the content being presented by the television device. In such implementations, the recommendation system can modify the ambient noise of a room by modifying sound output(s) of one or more user devices, such as mobile devices, computers (e.g., laptop computers, desktop computers, tablet computers, and/or any other suitable type of computers), televisions, stereos, speakers. Additionally or alternatively, in some implementations, the recommendation system can modify the ambient noise of the room by modifying sound output(s) from one or more household devices (e.g., dishwashers, refrigerators, smoke detectors, and/or any other suitable types of household devices) that are connected to a network.

Figure 12:
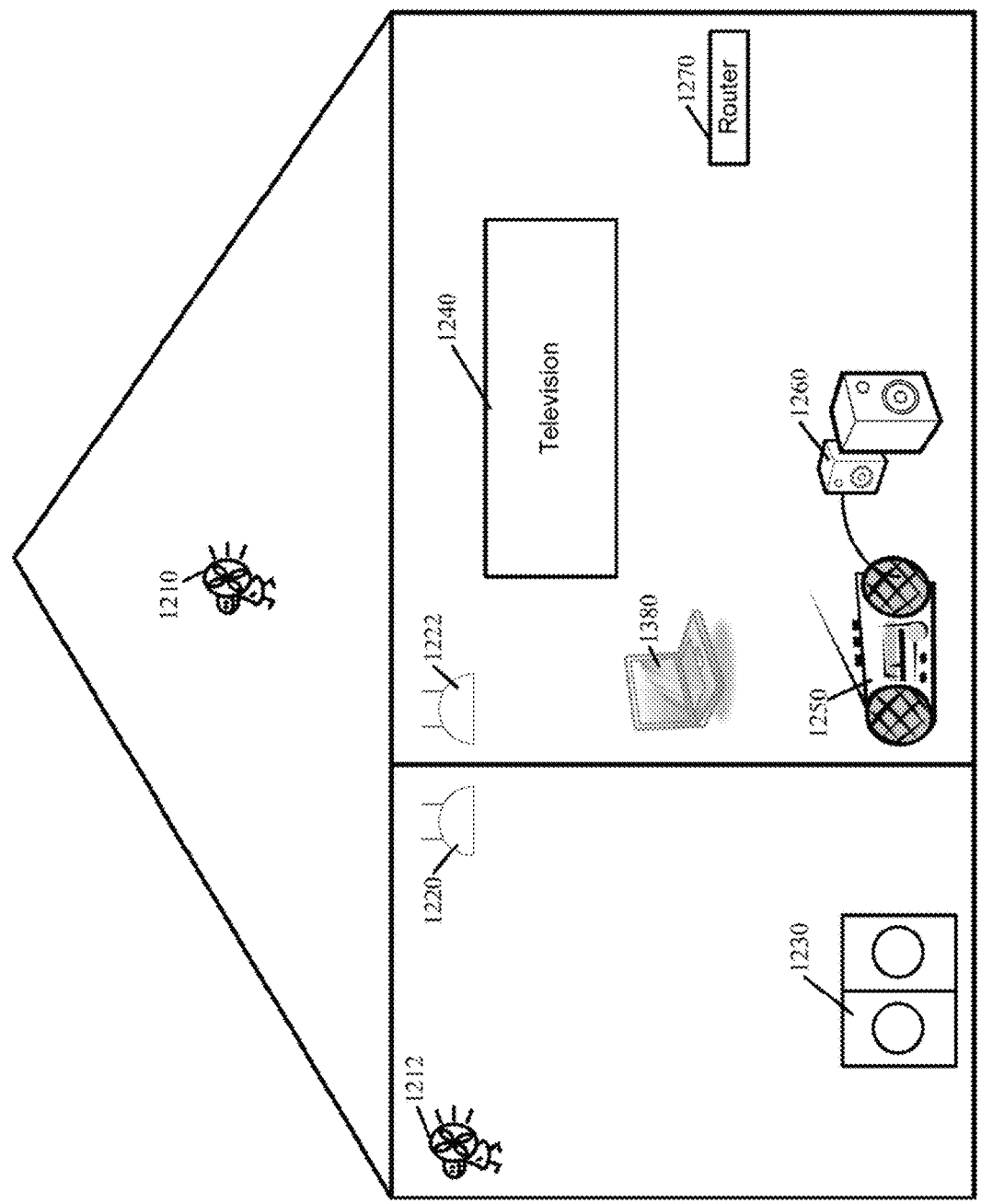
FIG. 12 shows an example layout of devices in a user's home that can be used to modify ambient noise in a room in accordance with some implementations of the disclosed subject matter.

FIG. 12 shows an illustrative example of a layout of devices in a user's home that can be used to modify the ambient noise or sounds in a room. Note that although FIG. 12 shows devices in a user's home, in some implementations, the processes described herein can be implemented in any suitable location, for example, a user's office, a business, and/or any other suitable location.

As shown, a user's home can include one or more devices and/or appliances that emit noise and/or sound, such as fans 1210 and 1212, washer/dryer 1230, television 1240, stereo 1250, speakers 1260, and/or laptop computer 1280. In some implementations, the user's home can additionally include one or more sound level sensors, such as sound level sensors 1220 and 1222. Note that the locations of the devices and sensors in FIG. 12 are shown as an example, and the devices and sensors can be located at any suitable locations. Additionally, in some implementations, any suitable number (including zero) of each device, and any additional devices can be included. In some implementations, a particular device can be detected and/or identified using any suitable device discovery protocol(s), as discussed below in connection with block 1330 of FIG. 13.

In some implementations, devices used to modify the ambient noise in a room can include devices with audio output capabilities, such as television 1240, stereo 1250, and laptop computer 1280. In some instances, such devices can be associated with speakers, such as speakers 1260. Additionally or alternatively, in some implementations, devices used to modify the ambient noise in a room can include devices that emit noise as a byproduct of operation, such as fans 1210 and washer/dryer 1230. Furthermore, in some implementations, devices with audio output capabilities can additionally emit noise as a byproduct of operation. For example, laptop computer 1280 can emit a noise when a cooling fan on laptop computer 1280 is activated. More particularly, the noise emitted by the cooling fan can vary in volume and/or pitch based on the speed of the fan. In some implementations, the ambient noise in a room can be modified using one or more of the devices, by modifying the sound emitted by the device (e.g., by modifying a speed of a fan) and/or by modifying sound output through audio output associated with the device, as described below in connection with block 1350 FIG. 13. Note that, in some implementations, a user can select which devices are to be used to modify the ambient noise. For example, in some implementations, the devices can be selected using a user interface, as shown in and described below in connection with FIG. 14.

In some implementations, sound level sensors 1220 and/or 1222 can be used to determine a type of sound present in a particular room and/or a particular location, a volume of the sound present in the room and/or the location, and/or to make any other suitable measurements. Additionally or alternatively, in some implementations, a type of sound present in a particular room and/or location can be determined based on recordings from one or more microphones in the room. For example, in some implementations, devices with recording capabilities can be identified, and recordings from microphones associated with the devices can be analyzed to identify the type of sound(s) present as well as volumes of the sound(s). In some implementations, these measurements can be used to determine an ambient sound that is to be produced, as described below in connection with block 1310 of FIG. 13.

It should be noted that, prior to recording the sounds presented in a particular room and/or location, detecting the type of sound, or any other suitable detections described herein, the recommendation application can provide the user with an opportunity to provide a consent or authorization to perform such detections. For example, upon loading the recommendation application on a computing device, such as a television device, the application can prompt the user to provide authorization for performing such detections, transmitting information relating to the detections, and/or presenting additional information relating to a detected type of sound. In a more particular example, in response to downloading the recommendation application from a suitable marketplace and loading the recommendation application, the user can be prompted with a message that requests (or requires) that the user provide consent prior to performing a detection of ambient sounds. Additionally or alternatively, in response to installing the recommendation application, the user can be prompted with a permission message that requests (or requires) that the user provide content prior to performing these detections and/or transmitting information relating to these detections. In the instance where the user consents to the use of such data, user presence at 102 can be detected.

Figure 13:
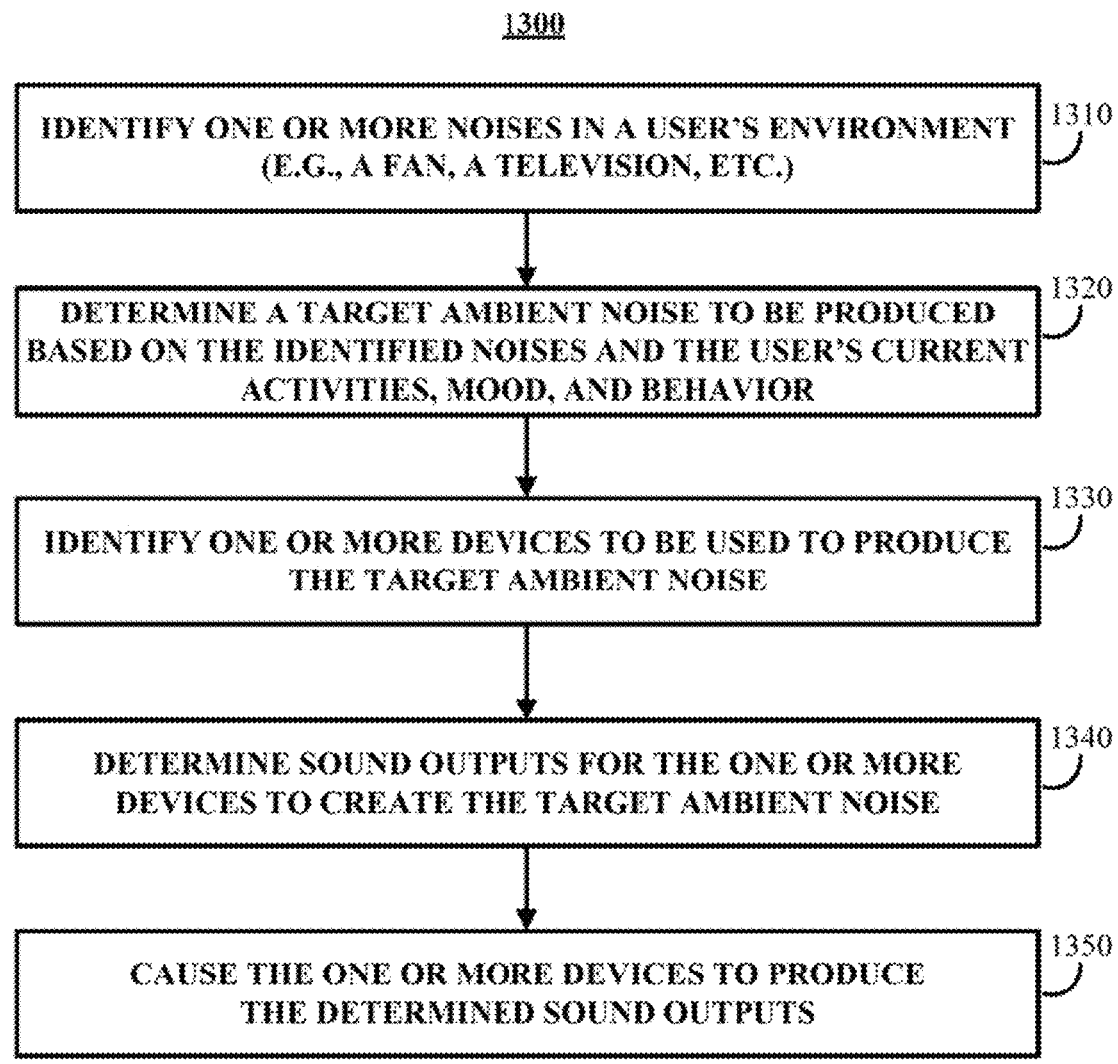
FIG. 13 shows an illustrative example of a process for modifying the ambient noise in a room in accordance with some implementations of the disclosed subject matter.
Figure 14:
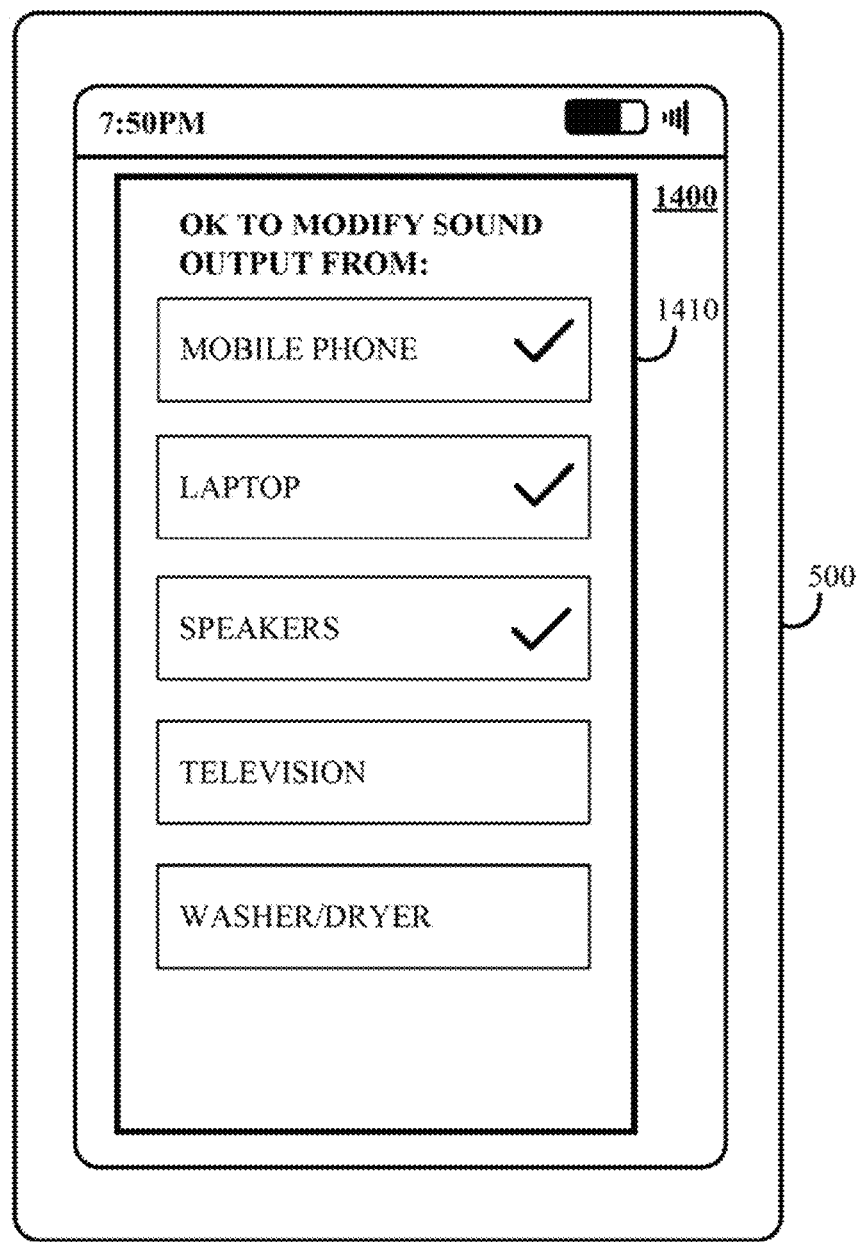
FIG. 14 shows an example of a user interface for selecting devices to be used to modify the ambient noise in a room in accordance with some implementations of the disclosed subject matter.

Turning to FIG. 13, an example 1300 of a process for modifying ambient noises using one or more devices is shown in accordance with some implementations of the disclosed subject matter.

Process 1300 can begin by identifying one or more noises in a user's environment at 1310. The noises can include any suitable sounds and/or noises, such as background noises (e.g., a fan, a hum of an appliance, and/or any other suitable background noises), conversation, sound from a television, stereo, computer, and/or other media playback device, and/or any other suitable sounds and/or noises.

Process 1300 can use any suitable technique(s) for identifying the one or more noises. For example, in some implementations, process 1300 can record audio from the user's environment using one or more microphones (e.g., a microphone associated with a user device, and/or any other suitable microphone) and can process the recorded audio to identify the one or more noises. In some implementations, audio processing techniques (e.g., equalization, filtering, noise cancellation, compression, and/or any other suitable techniques) can be used to process the audio prior to analysis. In some implementations, any suitable techniques can be used to identify the one or more sounds and/or noises, such as machine learning (e.g., Bayesian statistics, a neural network, support vector machines, and/or any other suitable machine learning techniques), statistical analysis (e.g., principal component analysis, independent component analysis, and/or any other suitable statistics analysis techniques), and/or any other suitable techniques. In some implementations, process 1300 can additionally or alternatively determine a sound level (e.g., in dB and/or any other suitable metric) of the sound and/or noise using sound level sensors 1220 and 1222 as shown in and described above in connection with FIG. 12.

In some implementations, process 1300 can use data relating to the user from multiple data sources to identify the one or more noises in the user's environment. For example, in some implementations, process 1300 can determine a user's current location using data from multiple data sources, such as a GPS location received from a user device, content from a social networking site (e.g., a post from the user identifying their location), timing information related to the user's typical locations for a particular day of the week and/or time of day, and/or any other suitable information. As a more particular example, in instances where process 1300 determines that the user is at work (e.g., based on a GPS location, based on information indicating that the user is typically at work at the current time of day, and/or based on any other suitable information), process 1300 can identify the one or more noises in the user's environment based on noises that are typically present in an office environment (e.g., conversation, a sound of typing, and/or any other suitable noises). As another more particular example, in instances where process 1300 determines that the user is at a restaurant (e.g., based on a GPS location, based on the user's post on a social networking site, and/or based on any other suitable information), process 1300 can identify the one or more noises based on noises that are typically present in a restaurant environment (e.g., conversation, a sound of utensils, background music, and/or any other suitable noises).

Process 1300 can determine a target ambient noise to be produced based on the identified noises and/or sounds and the user's current activities, moods, and behavior at 1320. For example, in some implementations, process 1300 can determine a target ambient noise that better allows the user to perform an activity the user is currently performing. As a more particular example, in some implementations, in an instance where the user is currently watching a television program, process 1300 can determine that the target ambient noise is to be quieter than the current detected background noise, which may allow the user to better hear the television. As a more particular example, in some implementations, in an instance where the user is determined to be working on a laptop computer that has a fan that is determined to be noisy (e.g., by determining that a sound level associated with noise from the fan exceeds a predetermined threshold, and/or based on any other metric), process 1300 can determine that the target ambient noise is to include the noise of the fan at a relatively lower sound level. As yet another more particular example, in some implementations, in an instance where the user is determined to be having trouble concentrating while working, process 1300 can determine that the target ambient noise is to fluctuate in amplitude and/or frequency, which may cause the user to become more alert.

As another example, in some implementations, process 1300 can determine a target ambient noise that augments one or more sounds currently detected at block 1310 that may provide a richer audio experience for the user. As a more particular example, in some implementations, in an instance where the user is determined to be watching a particular program (e.g., based on information received from microphones in the user's environment, based on information received from a user's posts on a social networking site, and/or based on any other suitable information), process 1300 can determine that the target ambient noise is to be a noise that corresponds to sound from the particular program. As a specific example, in an instance where the user is determined to be viewing media content related to cats, process 1300 can determine that the target ambient noise is to correspond to the sound of a cat purring. As another specific example, in an instance where the user is determined to be viewing media content related to waterfalls, process 1300 can determine that the target ambient noise is to correspond to the sound of a waterfall, rain, and/or any other suitable sound(s).

As yet another example, in some implementations process 1300 can determine that the target ambient noise is to be one that assists the user in achieving a particular goal. For example, if the user's goal is to fall asleep and/or to relax (e.g., determined based on a user's post on a social networking site, based on a user's typical activities at a particular time of day, based on information from an activity monitor, and/or based on any other suitable information), process 1300 can determine that the target ambient noise is to be white noise, the sound of rain, and/or any other suitable sound(s) that may be suitable for assisting the user in falling asleep and/or relaxing. As another example, if the user's goal is to relax, process 1300 can determine that the target ambient noise is to be a more pleasant version of the current background noise. As a specific example, in instances where the current background noise includes noise from one or more household appliances (e.g., a refrigerator, a washer/dryer, and/or any other suitable devices), process 1300 can determine that a target ambient noise that is more melodic (e.g., contains a particular type of fluctuations in pitch, and/or any other suitable type of melodic noise) than the current background noise that may assist the user in relaxing.

As still another example, in some implementations, process 1300 can determine that the target ambient noise is to be a current background noise presented at a higher sound level. In some implementations, process 1300 can determine that the target ambient noise is to be the current background noise presented at a higher sound level in response to determining that a user is not currently near a device and/or an appliance producing the current background noise (e.g., based on a location associated with a user device, posts on a social networking service, and/or based on any other suitable information). As a specific example, in some implementations, in response to determining that the user is not currently near a refrigerator (e.g., by determining that the user is not currently home based on location information associated with a user device), process 1300 can determine that the target ambient noise is to be a noise associated with the refrigerator presented at a higher sound level, and can determine that a compressor associated with the refrigerator is to be run at a higher level to produce the target ambient noise. In some implementations, the background noise can additionally or alternatively be associated with a fan associated with a computer, a compressor associated with an HVAC system, and/or any other suitable background noise. Note that, in some implementations, process 1300 can then determine that the target ambient noise is to be modified to be the background noise presented at a lower sound level after determining that the user has moved to be near the device and/or the appliance (e.g., based on location information associated with a user device, based on an activity monitor, and/or based on any other suitable information).

At still another example, in some implementations, process 1300 can determine a target ambient noise based on information associated with multiple user devices within a predetermined proximity (e.g., determined to be in the same room, determined to be within a particular distance of each other, determined to be connected to the same local area network, and/or based on any other suitable proximity metric). For example, in instances where process 1300 identifies (e.g., using a device discovery protocol, as described below in connection with block 1330), multiple user devices associated with different users and/or different user accounts, process 1300 can determine a target ambient noise based on a background noise associated with the multiple identified user devices (e.g., a conversation and/or an argument, a television program that is being presented, and/or any other suitable background noise), for example, by using a microphone associated with one of the user devices. As a specific example, in instances where the background noise is determined to be an argument (e.g., based on a sound level of the background noise, based on content of the conversation, and/or based on any other suitable information), process 1300 can determine a target ambient noise based on the determination that an argument is occurring, such as a particular item of music and/or a particular sound (e.g., the sound of a waterfall, white noise, and/or any other suitable sound).

Process 1300 can determine the target ambient noise using any suitable technique(s). For example, in some implementations, process 1300 can access a look-up table that identifies the target ambient noise based on a user's current activity and/or moods. Furthermore, in some implementations, process 1300 can use any suitable technique(s) to determine the user's current activity and/or moods, such as those described above in connection with process 400 of FIG. 4.

Process 1300 can identify one or more devices to be used to produce the target ambient noise at 1330. For example, in some implementations, the one or more devices can include fans 1210 and/or 1212, washer/dryer 1220, television 1240, stereo 1250, speakers 1260, and/or laptop computer 1280 as shown in and described above in connection with FIG. 12. Note that, in some implementations, any other suitable devices can be identified, such as a mobile phone, a tablet computer, a smoke detector, a refrigerator, and/or any other suitable devices. Process 1300 can identify the one or more devices using any suitable technique(s). For example, in some implementations, process 1300 can access a list (e.g., by querying a server, and/or in any other suitable manner) of devices that have been identified as associated with one or more users in the user's home. As a more particular example, in some implementations, the devices can be identified explicitly by a user, for example, through a user interface that receives identifiers (e.g., an IP address, a MAC address, a manufacturer of the device, a model and/or serial number of the device, and/or any other suitable information) of the devices. As another example, in some implementations, the devices can be identified using any suitable device discovery protocol (e.g., "Discovery and Launch," and/or any other suitable device discovery protocol(s)). As a more particular example, in some implementations, a first user device (e.g., a mobile phone, a tablet computer, and/or any other suitable device) can use a device discovery protocol to identify nearby devices (e.g., a nearby television, a nearby speaker, a nearby smoke detector, and/or any other suitable device). In some such implementations, the first user device can cause identifiers (e.g., an IP address, a MAC address, a name of a manufacturer of the device, a user-specified name associated with the device, and/or any other suitable information) of the discovered devices to be stored (e.g., in one of server(s) 120) for later use.

Process 1300 can determine sound outputs for the identified one or more devices to create the target ambient noise at 1340. For example, if, at block 1320, process 1300 determined that the target ambient noise is to be white noise, and if, at block 1330, process 1300 identified a laptop computer as a device to be used to produce the target ambient noise, process 1300 can determine a sound output for the laptop computer that will approximate the white noise. As a more particular example, in some implementations, process 1300 can determine that causing a fan associated with the laptop computer to spin at a particular speed or at a pattern of particular speeds, will produce a noise that approximates white noise. As another more particular example, in some implementations, process 1300 can cause the laptop computer to emit a noise that approximates white noise through speakers associated with the laptop computer, for example, by causing the laptop computer to synthesize the white noise, play an audio file that contains white noise, and/or through any other suitable techniques. Note that, in some implementations, process 1300 can determine that the target ambient noise is to be produced gradually. For example, if the target ambient noise is to be a sound and/or noise at a particular sound level, process 1300 can determine that the target sound level is to be reached over any suitable time period (e.g., over a minute, over ten minutes, over half an hour, and/or any other suitable time period). As another example, in some implementations, process 1300 can determine that the target ambient noise is to be produced gradually, dependent on a particular user action. As a more particular example, process 1300 can determine that the sound level of the target ambient noise is to be increased until a particular user action is recorded (e.g., the user begins interacting with a computer, the user falls asleep, the user increases movement, and/or any other suitable user action).

As another example, if, at block 1320, process 1300 determine that the target ambient noise is to be a current background noise presented at a lower sound level, process 1300 can determine sound outputs for the identified one or more devices to lower the sound level of the current background noise and/or determine sound outputs that create a perception of a lower sound level of the current background noise. As a more particular example, in an instance where it is determined that the current background noise includes a fan associated with a computer, process 1300 can determine that the sound output is to include the fan operating at a lower speed to produce a lower volume of noise. As another more particular example, process 1300 can determine sound outputs for the one or more identified devices using any suitable noise cancellation techniques to create a perception of a lower sound level. As a specific example, in an instance where it is determined that the current background noise includes a fan associated with a computer, process 1300 can cause sound outputs from any suitable number of nearby devices that, through interference with the noise from the fan, cause a perception of a lower sound level of background noise. In some such implementations, process 1300 can additionally use any suitable information, such as locations of the one or more identified devices, a location of a user, and/or any other suitable information, to calculate that sound outputs required to perform noise cancellation.

In some implementations, process 1300 can determine the sound outputs for the identified one or more devices based on a device type and/or device capabilities associated with the one or more devices. For example, in some implementations, process 1300 can determine that the target ambient sound is to be produced solely through modulation of fan speeds (e.g., to control pitch and/or loudness associated with the produced sound) associated with the one or more devices in response to determining that the one or more devices are not associated with audio output capabilities. As another example, in some implementations, process 1300 can determine that the target ambient noise is to be produced by turning a fan associated with the one or more devices on and off in response to determining that the one or more devices are not associated with audio output capabilities. As yet another example, in some implementations, process 1300 can determine that the target ambient sound is to be produced by playing a particular audio file in response to determining that at least one of the one or more devices is associated with audio output and/or speakers. More particularly, in some implementations, process 1300 can cause the device to download the particular audio file, for example, from a media content sharing service, an application store, and/or any other suitable site. Note that, in some implementations, any suitable number (e.g., one, two, four, and/or any other suitable number) of the identified devices can be used to produce the target ambient noise, and a type of sound output (e.g., audio output, sound output through modulation of fan speed, and/or any other suitable type of sound output) corresponding to each of the devices can be different. In implementations where multiple devices are to be used to produce the target ambient noise, process 1300 can calculate the sound outputs for each of the devices such that the superposition of the sound outputs approximates the target ambient noise.

In instances where process 1300 determines that the one or more devices are to synthesize the target ambient noise (e.g., by modulating the speed of fans associated with the one or more devices, synthesizing the sound and then causing the synthesized sound to be played through audio output associated with the one or more devices, and/or any other suitable techniques), process 1300 can calculate one or more parameters to create the synthesized target ambient noise. For example, if the target ambient noise includes a particular noise such as that of a cat purring, and if the target ambient noise is to be produced by modulating the speed of a fan of a particular device, process 1300 can calculate the temporal pattern of the fan speed required to produce an approximation of the cat purring noise. As another example, in some implementations, process 1300 can calculate one or more signals (e.g., sine waves, and/or any other suitable signals) that are to be combined and presented through an audio output to produce an approximation of the target ambient noise.

In some implementations, process 1300 can use any suitable signal processing techniques (e.g., spectral analysis, filtering, digital signal processing, and/or any other suitable techniques) to calculate the sound outputs required to produce the target ambient noise. As a specific example, in some implementations, process 1300 can band-pass filter a representation of the target ambient noise into a number of bands that corresponds to a number of identified devices, and can determine that the sound output corresponding to each of the identified devices is to correspond to a particular carrier sound output (e.g., a band of noise centered at a particular frequency, a fan operating at a particular speed, and/or any other suitable sound output) amplitude modulated based on the energy present in that particular band. Note that, in some such implementations, the sound output can correspond to sound produced through an audio output and/or a sound emitted as a byproduct of operation by a particular device.

In some implementations, process 1300 can determine one or more characteristics of the target ambient noise that are to be approximated by the produced sound output(s). For example, if the target ambient noise includes a particular waveform, process 1300 can determine that peaks and/or valleys of the waveform are to be approximated by the produced sound output(s) and/or the combination of sound output(s) from multiple devices. Other examples of characteristics include energy present in particular spectral bands, peaks and/or valleys of an envelope of the waveform, temporal characteristics corresponding to an envelope of the waveform, and/or any other suitable characteristics or combination of characteristics. Furthermore, in some implementations, if process 1300 determines that an approximation of one or more characteristics of the target ambient noise cannot be produced with the combination of sound output(s), process 1300 can determine that the sound output(s) are not to be produced. In some implementations, the approximation of the target ambient noise can be quantified in any suitable manner (e.g., root-mean square error, a correlation, and/or any other suitable metric).

At 1350, process 1300 can cause the one or more devices to produce the sound outputs determined at block 1340 using any suitable technique or combination of techniques. For example, in instances where the sound output includes modulating a speed of a fan associated with a device, process 1300 can control the fan by accessing an API associated with the device. More particularly, the API can control the speed of the fan using pulse-width modulation, and/or any other suitable techniques. As another example, in instances where the sound output includes causing a particular output from an audio output associated with the device, process 1300 can transmit a message to the device that specifies the output and includes instructions for causing the output to be played through the audio output. As a more particular example, if the sound output includes a synthesized approximation of the target ambient sound, process 1300 can specify a waveform that is to be played through the audio output. As another more particular example, if the sound output includes an audio file that is to be played through the audio output, process 1300 can specify identifying information related to the audio file, such as a file name, a file location, downloading instructions, and/or any other suitable information.

In some implementations, process 1300 can assign a rating and/or a confidence score to the sound output(s) and/or the target ambient noise. In some implementations, the rating and/or the confidence score can be based on a prediction of whether the user will like the sound output(s) and/or the target ambient noise. The rating and/or the confidence score can be based on any suitable information (e.g., a user's previous feedback, the devices selected to produce the sound output(s), and/or any other suitable information). For example, in instances where the sound output(s) are determined to be similar to a sound output the user has previously indicated that the user liked, the rating and/or the confidence score can be relatively higher than those corresponding to other sound output(s). As another example, in instances where the sound output is produced using devices that the user has previously indicated that the user liked, the rating and/or the confidence score can be relatively higher than those corresponding to other sound output(s). Additionally, in some implementations, if process 1300 determines there is no information suitable to assign the rating and/or the confidence score, process 1300 can assign a rating and/or confidence score that indicates uncertainty (e.g., a 5 on a scale from 0 to 10, and/or any other suitable score). Furthermore, in some implementations, if the assigned rating is determined to be below a predetermined threshold, process 1300 can determine that the sound output(s) should not be produced.

In some implementations, after the sound outputs are produced, feedback from the user can be received, for example, through a user interface (similar to the interface shown in FIG. 11). In some implementations, feedback can include whether the user liked or disliked the particular sounds produced, whether the user liked or disliked use of the devices used to produce the sound, whether the produced sound was too loud or too soft, and/or any other suitable feedback. In some implementations, the received user feedback can be used to adjust a target ambient noise, a sound profile, determine target ambient noises for other users (e.g., similar users placed in the same group, users having similar objectives and/or goals, etc.), for example, at block 1320 of FIG. 13. In some implementations, the received user feedback can be used to adjust the rating and/or the confidence score associated with the sound output(s).

In some implementations, a user can select and/or deselect a particular device as one from which process 1300 can cause the target ambient noise to be produced. For example, in some implementations, the user can select and/or deselect particular devices using a user interface, as shown in user interface 1400 of FIG. 14. As shown, user interface 1400 can include a selection of devices 1410. In some implementations, each of the devices shown in selection of devices 1410 can be selected and/or deselected for inclusion in a group of devices available to produce the target ambient noise. In some implementations, the selection mechanism can include any suitable user interface elements, such as checkboxes, drop-down menus, radio buttons, and/or any other suitable elements. In some implementations, an indication that a particular device has been selected and/or deselected using user interface 1400 can be transmitted from a user device presenting user interface 1400 to one of servers(s) 120 as described above in connection with FIG. 1.

Accordingly, methods, systems, and media for ambient background noise modification based on mood and/or behavior information are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A method for noise modification, the method comprising:
 determining a target noise to be produced by an audio device based on a state of a user and a current ambient sound in proximity to the audio device;
 causing a sound output to be produced by the audio device that produces an approximation of the target noise;
 determining an updated state of the user; and
 causing the sound output produced by the audio device to be changed based on an update to the target noise that is determined from the updated state of the user.

2. The method of claim 1, wherein the current ambient sound in proximity to the audio device is detected using a microphone of the audio device.

3. The method of claim 1, wherein the state of the user is determined using a motion sensor.

4. The method of claim 1, wherein the audio device is selected as a device that produces the sound output that approximates the target noise via a user interface presented on a mobile device associated with the audio device.

5. The method of claim 1, wherein the target noise is determined to change a perception of the current ambient sound when the sound output that approximates the target noise is produced.

6. The method of claim 5, wherein the target noise is determined to reduce a perceived loudness of the current ambient sound.

7. A system for noise modification, the system comprising:
 a hardware processor that:
  determines a target noise to be produced by an audio device based on a state of a user and a current ambient sound in proximity to the audio device;
  causes a sound output to be produced by the audio device that produces an approximation of the target noise;
  determines an updated state of the user; and
  causes the sound output produced by the audio device to be changed based on an update to the target noise that is determined from the updated state of the user.

8. The system of claim 7, wherein the current ambient sound in proximity to the audio device is detected using a microphone of the audio device.

9. The system of claim 7, wherein the state of the user is determined using a motion sensor.

10. The system of claim 7, wherein the audio device is selected as a device that produces the sound output that approximates the target noise via a user interface presented on a mobile device associated with the audio device.

11. The system of claim 7, wherein the target noise is determined to change a perception of the current ambient sound when the sound output that approximates the target noise is produced.

12. The system of claim 11, wherein the target noise is determined to reduce a perceived loudness of the current ambient sound.

13. A non-transitory computer-readable medium containing computer executable instructions that, when executed by a processor, cause the processor to perform a method for noise modification, the method comprising:
 determining a target noise to be produced by an audio device based on a state of a user and a current ambient sound in proximity to the audio device;
 causing a sound output to be produced by the audio device that produces an approximation of the target noise;
 determining an updated state of the user; and
 causing the sound output produced by the audio device to be changed based on an update to the target noise that is determined from the updated state of the user.

14. The non-transitory computer-readable medium of claim 13, wherein the current ambient sound in proximity to the audio device is detected using a microphone of the audio device.

15. The non-transitory computer-readable medium of claim 13, wherein the state of the user is determined using a motion sensor.

16. The non-transitory computer-readable medium of claim 13, wherein the audio device is selected as a device that produces the sound output that approximates the target noise via a user interface presented on a mobile device associated with the audio device.

17. The non-transitory computer-readable medium of claim 13, wherein the target noise is determined to change a perception of the current ambient sound when the sound output that approximates the target noise is produced.

18. The non-transitory computer-readable medium of claim 17, wherein the target noise is determined to reduce a perceived loudness of the current ambient sound.

\* \* \* \* \*